United States Patent
Jain et al.

(10) Patent No.: US 12,426,114 B2
(45) Date of Patent: Sep. 23, 2025

(54) TECHNIQUES FOR CONFIGURING A TRANSMISSION POWER PARAMETER AFTER TUNING BACK TO A SUBSCRIPTION IN A DUAL CONNECTIVITY MODE

(71) Applicant: QUALCOMM Incorporated, San Diego, CA (US)

(72) Inventors: Sachin Jain, Santa Clara, CA (US); Rizwan Saudagar Mohammed, Milpitas, CA (US); Troy Curtiss, Boulder, CO (US)

(73) Assignee: QUALCOMM Incorporated, San Diego, CA (US)

( * ) Notice: Subject to any disclaimer, the term of this patent is extended or adjusted under 35 U.S.C. 154(b) by 577 days.

(21) Appl. No.: 17/646,331

(22) Filed: Dec. 29, 2021

(65) Prior Publication Data

US 2022/0225455 A1    Jul. 14, 2022

Related U.S. Application Data

(60) Provisional application No. 63/136,083, filed on Jan. 11, 2021.

(51) Int. Cl.
*H04W 76/16*    (2018.01)
*H04W 52/16*    (2009.01)
(Continued)

(52) U.S. Cl.
CPC ......... *H04W 76/16* (2018.02); *H04W 52/16* (2013.01); *H04W 52/225* (2013.01); *H04W 52/242* (2013.01)

(58) Field of Classification Search
CPC ... H04W 76/16; H04W 52/16; H04W 52/225; H04W 52/242
See application file for complete search history.

(56) References Cited

U.S. PATENT DOCUMENTS 9,107,168 B2    8/2015   Taha et al.
9,775,082 B1 *  9/2017   Chakraborty ..... H04W 36/0094
(Continued)

FOREIGN PATENT DOCUMENTS

CN    104968035 A    10/2015
EP    3340732 A1     6/2018
(Continued)

OTHER PUBLICATIONS

International Search Report and Written Opinion—PCT/US2021/073174—ISA/EPO—Apr. 28, 2022.

*Primary Examiner* — Junpeng Chen
(74) *Attorney, Agent, or Firm* — Dalei Dong; Harrity & Harrity, LLP

(57) ABSTRACT

Various aspects of the present disclosure generally relate to wireless communication. In some aspects, a user equipment (UE) may establish a first connection of a first radio access technology (RAT) associated with a first subscription of the UE. The UE may establish a second connection of a second RAT associated with the first subscription of the UE. The UE may establish a third connection of a third RAT associated with a second subscription of the UE. The UE may tune away from the first connection to receive a communication via the third connection. The UE may tune back to the first connection from the third connection. The UE may configure a transmission power parameter of the first connection based at least in part on a time-averaged parameter. Numerous other aspects are described.

30 Claims, 13 Drawing Sheets

(51) Int. Cl.
*H04W 52/22* (2009.01)
*H04W 52/24* (2009.01)

(56) References Cited

U.S. PATENT DOCUMENTS

| | | | |
|---|---|---|---|
| 2012/0184327 A1 | 7/2012 | Love et al. | |
| 2013/0260761 A1 | 10/2013 | Walke et al. | |
| 2013/0295920 A1* | 11/2013 | Viswanadham | H04W 76/28 |
| | | | 455/426.1 |
| 2013/0337861 A1 | 12/2013 | Bhogaraju et al. | |
| 2014/0120859 A1* | 5/2014 | Ekici | H04W 4/90 |
| | | | 455/450 |
| 2014/0155119 A1* | 6/2014 | Bishop | H04W 52/36 |
| | | | 455/552.1 |
| 2014/0200685 A1 | 7/2014 | Ngai et al. | |
| 2015/0119103 A1* | 4/2015 | Ngai | H04W 88/06 |
| | | | 455/552.1 |
| 2016/0029199 A1* | 1/2016 | Shi | H04M 15/8038 |
| | | | 455/432.1 |
| 2016/0029222 A1 | 1/2016 | Su et al. | |
| 2017/0064641 A1* | 3/2017 | Logan | H04W 52/367 |
| 2020/0021421 A1* | 1/2020 | Han | H04W 52/367 |
| 2020/0137819 A1 | 4/2020 | Shi et al. | |
| 2020/0267662 A1* | 8/2020 | Godala | H04W 52/367 |
| 2021/0099194 A1* | 4/2021 | Jadhav | H04B 1/3838 |
| 2021/0400599 A1* | 12/2021 | Gopal | H04W 52/367 |
| 2022/0201693 A1* | 6/2022 | Hwang | H04W 28/0268 |

FOREIGN PATENT DOCUMENTS

| | | |
|---|---|---|
| WO | 2014047364 | 3/2014 |
| WO | 2014113825 A2 | 7/2014 |

\* cited by examiner

TECHNIQUES FOR CONFIGURING A TRANSMISSION POWER PARAMETER AFTER TUNING BACK TO A SUBSCRIPTION IN A DUAL CONNECTIVITY MODE

CROSS-REFERENCE TO RELATED APPLICATION

This patent application claims priority to U.S. Provisional Patent Application No. 63/136,083, filed on Jan. 11, 2021, entitled "TECHNIQUES FOR CONFIGURING A TRANSMISSION POWER PARAMETER AFTER TUNING BACK TO A SUBSCRIPTION IN A DUAL CONNECTIVITY MODE," and assigned to the assignee hereof. The disclosure of the prior application is considered part of and is incorporated by reference into this patent application.

FIELD OF THE DISCLOSURE

Aspects of the present disclosure generally relate to wireless communication and to techniques and apparatuses for configuring a transmission power parameter after tuning back to a subscription in a dual connectivity mode.

DESCRIPTION OF RELATED ART

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A UE may communicate with a BS via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, or the like.

The above multiple access technologies have been adopted in various telecommunication standards to provide a common protocol that enables different user equipment to communicate on a municipal, national, regional, and even global level. NR, which may also be referred to as 5G, is a set of enhancements to the LTE mobile standard promulgated by the 3GPP. NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include establishing a first connection of a first radio access technology (RAT) associated with a first subscription of the UE. The method may include establishing a second connection of a second RAT associated with the first subscription of the UE. The method may include establishing a third connection of a third RAT associated with a second subscription of the UE. The method may include tuning away from the first connection to receive a communication via the third connection. The method may include tuning back to the first connection from the third connection. The method may include configuring a transmission power parameter of the first connection based at least in part on a time-averaged parameter.

Some aspects described herein relate to a UE for wireless communication. The user equipment may include a memory and one or more processors coupled to the memory. The one or more processors may be configured to establish a first connection of a first RAT associated with a first subscription of the UE. The one or more processors may be configured to establish a second connection of a second RAT associated with the first subscription of the UE. The one or more processors may be configured to establish a third connection of a third RAT associated with a second subscription of the UE. The one or more processors may be configured to tune away from the first connection to receive a communication via the third connection. The one or more processors may be configured to tune back to the first connection from the third connection. The one or more processors may be configured to configure a transmission power parameter of the first connection based at least in part on a time-averaged parameter.

Some aspects described herein relate to a non-transitory computer-readable medium that stores a set of instructions for wireless communication by a UE. The set of instructions, when executed by one or more processors of the UE, may cause the UE to establish a first connection of a first RAT associated with a first subscription of the UE. The set of instructions, when executed by one or more processors of the UE, may cause the UE to establish a second connection of a second RAT associated with the first subscription of the UE. The set of instructions, when executed by one or more processors of the UE, may cause the UE to establish a third connection of a third RAT associated with a second subscription of the UE. The set of instructions, when executed by one or more processors of the UE, may cause the UE to tune away from the first connection to receive a communication via the third connection. The set of instructions, when executed by one or more processors of the UE, may cause the UE to tune back to the first connection from the third connection. The set of instructions, when executed by one or more processors of the UE, may cause the UE to configure a transmission power parameter of the first connection based at least in part on a time-averaged parameter.

Some aspects described herein relate to an apparatus for wireless communication. The apparatus may include means for establishing a first connection of a first RAT associated with a first subscription of the apparatus. The apparatus may include means for establishing a second connection of a second RAT associated with the first subscription of the apparatus. The apparatus may include means for establishing a third connection of a third RAT associated with a second subscription of the apparatus. The apparatus may include means for tuning away from the first connection to receive a communication via the third connection. The apparatus may include means for tuning back to the first connection from the third connection. The apparatus may include means for configuring a transmission power parameter of the first connection based at least in part on a time-averaged parameter.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
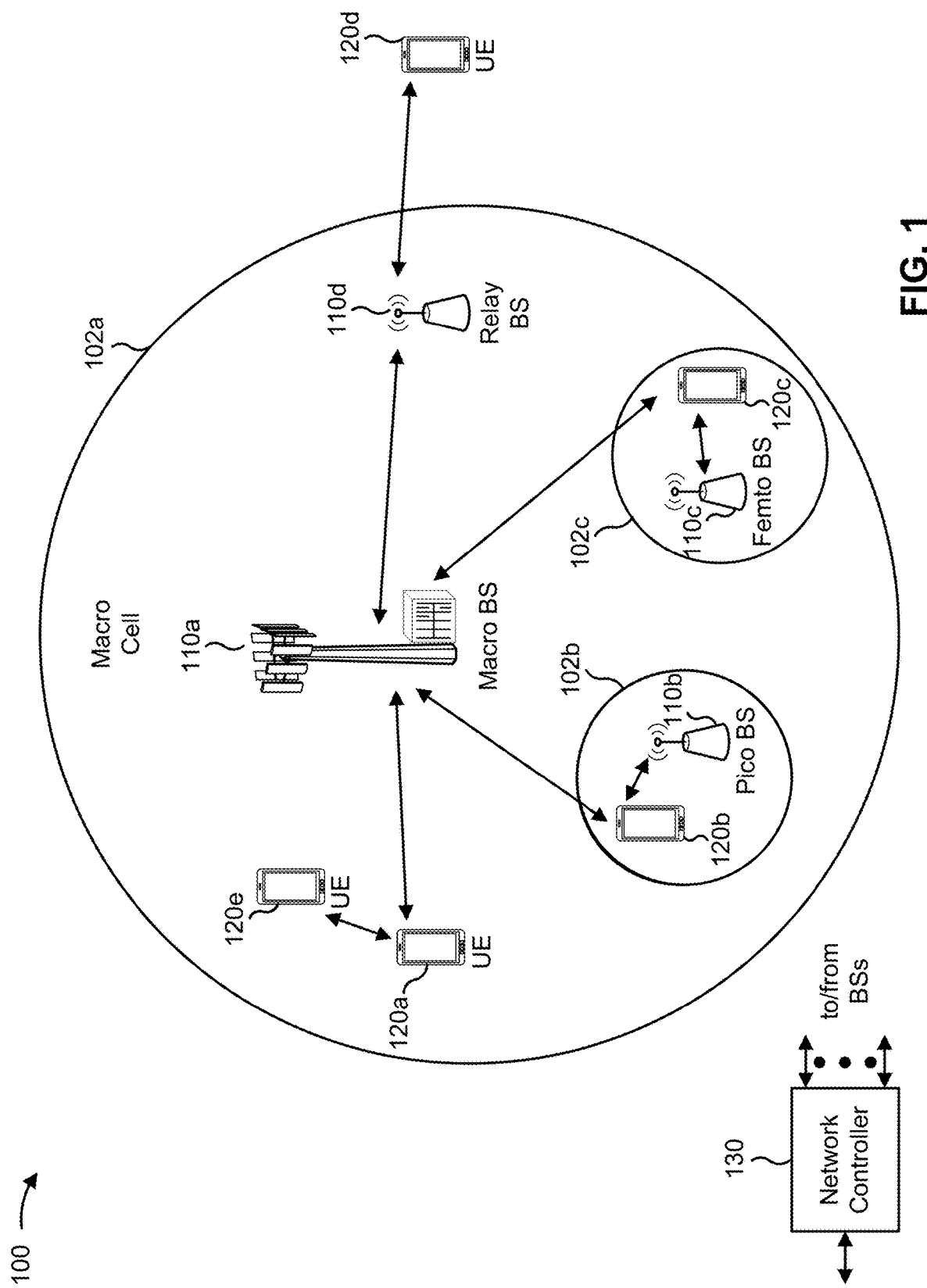
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (NR) network and/or an LTE network, among other examples. The wireless network 100 may include a number of base stations 110 (shown as BS 110*a*, BS 110*b*, BS 110*c*, and BS 110*d*) and other network entities. A base station (BS) is an entity that communicates with user equipment (UEs) and may also be referred to as an NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, or the like.

Wireless network 100 may be a heterogeneous network that includes BSs of different types, such as macro BSs, pico BSs, femto BSs, relay BSs, or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
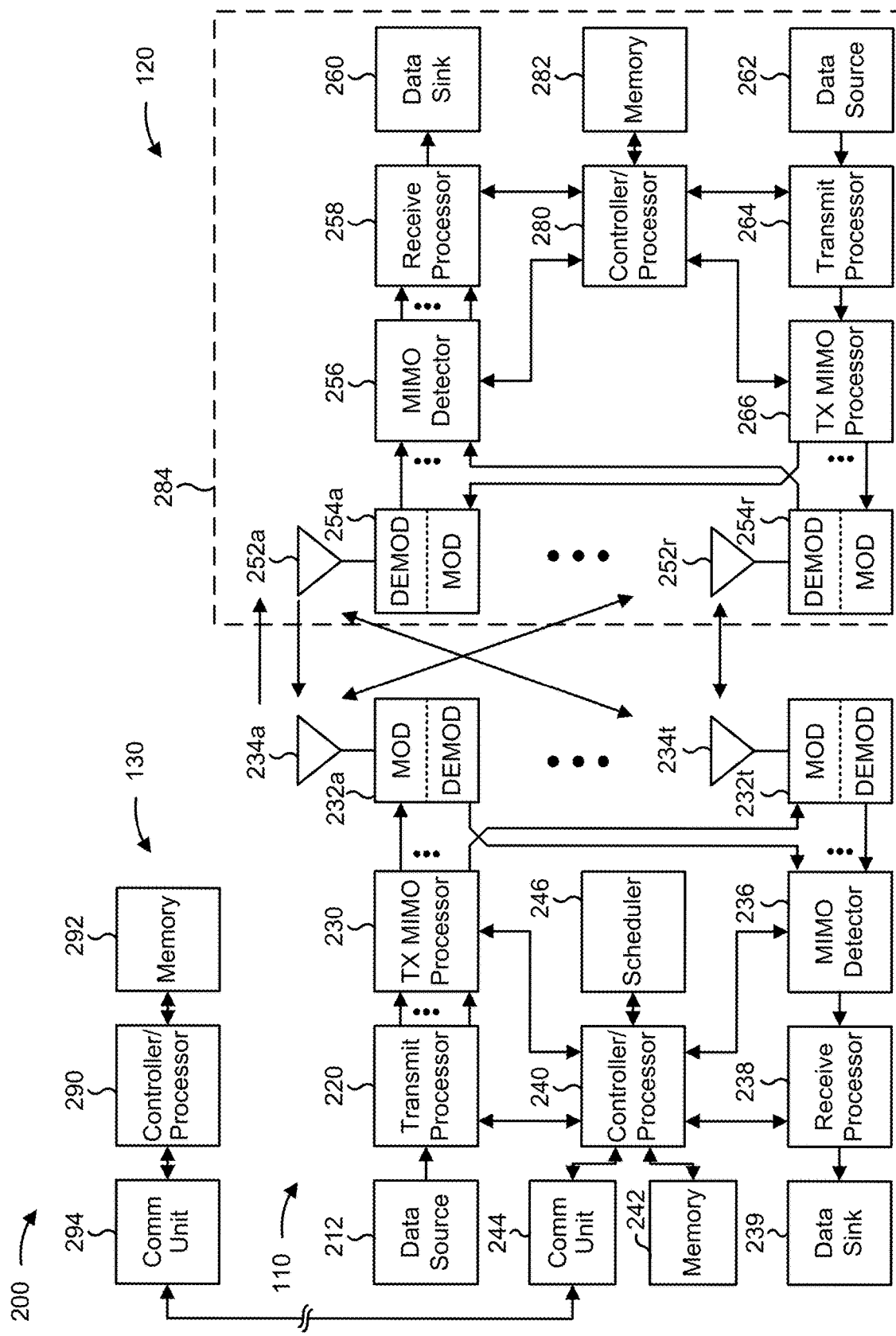
FIG. 2 is a diagram illustrating an example of a base station in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, an/or a CQI parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein.

Controller/processor 240 of base station 110, controller/processor 280 of UE 120, and/or any other component(s) of FIG. 2 may perform one or more techniques associated with configuring a transmission power parameter after tuning back to a subscription in a dual connectivity mode, as described in more detail elsewhere herein. For example, controller/processor 240 of base station 110, controller/processor 280 of UE 120, and/or any other component(s) of FIG. 2 may perform or direct operations of, for example, process 700 of FIG. 7 and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 700 of FIG. 7 and/or other processes as described herein. In some aspects, executing instructions may include running the instructions, converting the instructions, compiling the instructions, and/or interpreting the instructions.

In some aspects, the UE includes means for establishing a first connection of a first RAT associated with a first subscription of the UE; means for establishing a second connection of a second RAT associated with the first subscription of the UE; means for establishing a third connection of a third RAT associated with a second subscription of the UE; means for tuning away from the first connection to receive a communication via the third connection; means for tuning back to the first connection from the third connection; or means for configuring a transmission power parameter of the first connection based at least in part on a time-averaged parameter. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for ignoring one or more transmission power control commands received for the first connection.

In some aspects, the UE includes means for ignoring a configured number of transmission power control commands received after tuning back to the first connection.

In some aspects, the UE includes means for ignoring one or more transmission power control commands received within a configured number of subframes after tuning back to the first connection.

In some aspects, the UE includes means for ignoring one or more transmission power control commands received within a configured amount of time after tuning back to the first connection.

In some aspects, the UE includes means for reverting to a configuration of the transmission power parameter used for the first connection before tuning away from the first connection.

In some aspects, the UE includes means for determining one or more of a first pathloss reference signal (PL RS) measurement or a first RSRP before tuning away from the first connection; means for determining one or more of a second PL RS measurement or a second RSRP after tuning back to the first connection; or means for determining, based at least in part on one or more of a difference between the first PL RS and the second PL RS or a difference between the first RSRP and the second RSRP, to modify a value of the transmission power parameter used for the first connection before tuning away from the first connection.

In some aspects, the UE includes means for determining to modify the value of the transmission power parameter based at least in part on the difference between the first PL RS and the second PL RS satisfying a PL RS change threshold or the difference between the first RSRP and the second RSRP satisfying an RSRP change threshold.

In some aspects, the UE includes means for configuring the transmission power parameter for transmitting via a data channel of the first connection based at least in part on ignoring one or more transmission power control commands received for the first connection after tuning back to the first connection; or means for configuring the transmission power parameter for transmitting via a control channel of the first connection based at least in part on applying the one or more transmission power control commands received for the first connection after tuning back to the first connection.

In some aspects, the UE includes means for receiving, after tuning back to the first connection, one or more transmission power control commands for the first connection; or means for ignoring the one or more transmission power control commands based at least in part on a determination that applying the one or more transmission power control commands would impose a limit on a transmission power parameter for transmitting via the second connection.

In some aspects, the UE includes means for receiving, after tuning back to the first connection, one or more transmission power control commands for the first connection; or means for applying the one or more transmission power control commands based at least in part on a determination that applying the one or more transmission power control commands would not impose a limit on a transmission power parameter for transmitting via the second connection.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
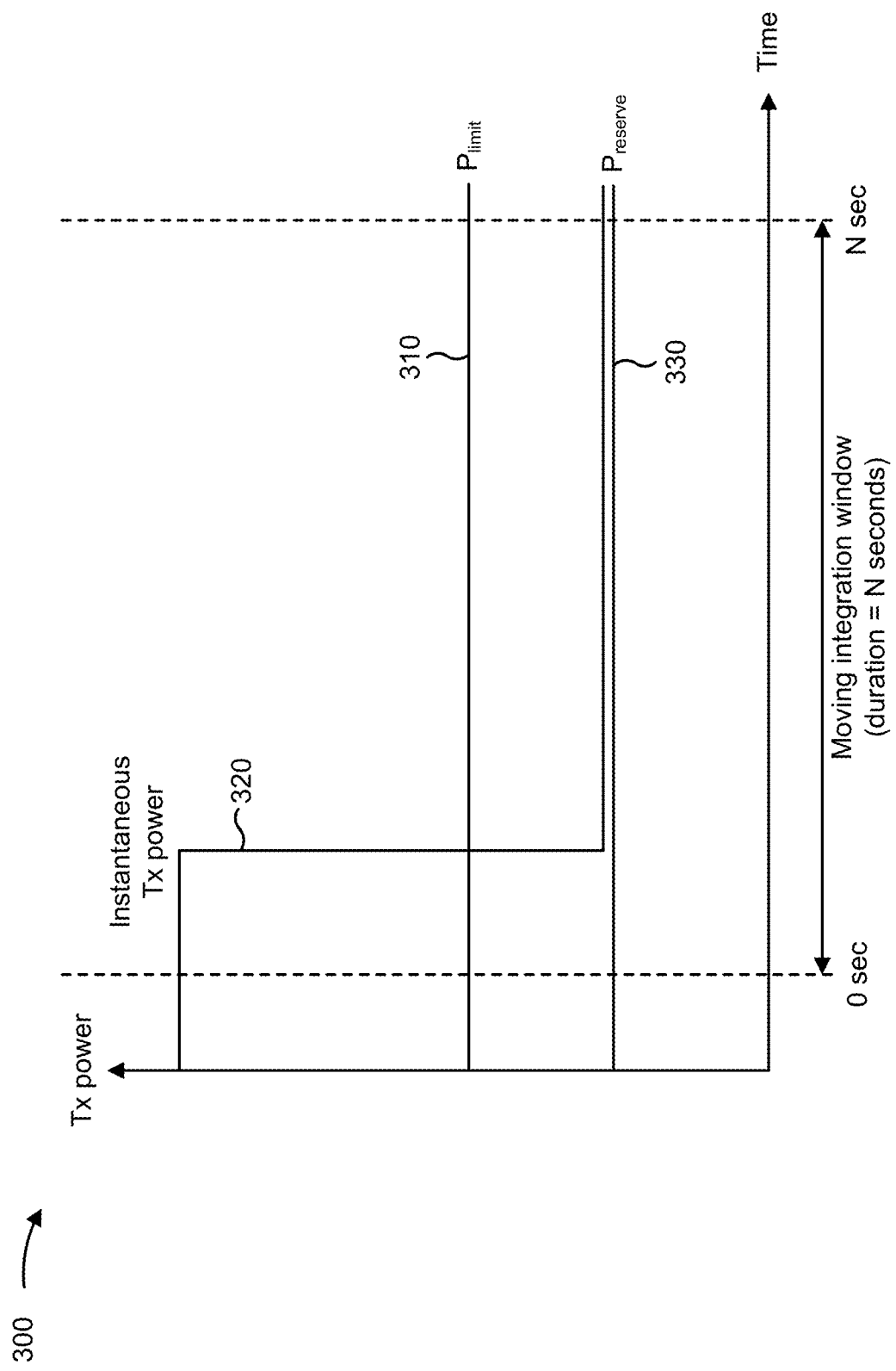
FIG. 3 is a diagram illustrating an example of a UE adapting transmit power over a moving integration window to satisfy one or more radio frequency (RF) radiation exposure limits, in accordance with the present disclosure.

FIG. 3 is a diagram illustrating an example 300 of a UE adapting transmit power over a moving integration window to satisfy one or more radio frequency (RF) radiation exposure limits, in accordance with the present disclosure.

Because UEs may emit RF waves, microwaves, and/or other radiation, UEs are generally subject to regulatory RF safety requirements that set forth specific guidelines, or exposure limits, that constrain various operations that the UEs can perform. For example, RF emissions may generally increase when a UE is transmitting, and the RF emissions may further increase in cases where the UE is performing frequent transmissions, high-power transmissions, or the like. Accordingly, because frequent and/or high-power transmission may lead to significant RF emissions, regulatory agencies (e.g., the Federal Communications Commission (FCC) in the United States) may provide information related to acceptable RF radiation exposure when UEs are communicating using different radio access technologies.

In some examples, RF exposure may be expressed in terms of a specific absorption rate (SAR), which measures energy absorption by human tissue per unit mass and may have units of watts per kilogram (W/kg). For example, when a UE is communicating using a RAT that operates in a frequency range below 6 GHz, the applicable RF exposure parameter may include the SAR. In particular, SAR requirements generally specify that overall radiated power by a UE is to remain under a certain level to limit heating that may occur when RF energy is absorbed. Because SAR exposure may be used to assess RF exposure for transmission frequencies less than 6 GHz, SAR exposure limits typically cover wireless communication technologies such as 2G/3G (e.g., CDMA), 4G (e.g., 3GPP Long Term Evolution (LTE)), certain 5G bands (e.g., NR in 6 GHz bands), IEEE 802.11ac, and other wireless communication technologies.

RF exposure may also be expressed in terms of power density (PD), which measures energy absorption per unit area and may be expressed in units of $mW/cm^2$. For example, when a UE is communicating using a RAT that operates in a high frequency range, such as a millimeter wave (mmW) frequency range, the applicable RF exposure parameter is PD, which may be regulated to limit heating of the UE and/or nearby surfaces. In certain cases, a maximum permissible exposure (MPE) limit in terms of PD may be imposed for wireless communication devices using transmission frequencies above 6 GHz. The MPE limit is a regulatory metric for exposure based on area, such as an energy density limit defined as a number, X, of watts per square meter ($W/m^2$) averaged over a defined area and time-averaged over a frequency-dependent time window to prevent a human exposure hazard represented by a tissue temperature change. Because PD limits are typically used to assess RF exposure for transmission frequencies higher than 10 GHz, PD limits typically cover wireless communication technologies such as IEEE 802.11ad, 802.11ay, certain 5G bands (e.g., mmWave bands), and other wireless communication technologies.

Accordingly, different metrics may be used to assess RF exposure for different wireless communication technologies. UEs generally must satisfy all applicable RF exposure limits (e.g., SAR exposure limits or PD (e.g., MPE) exposure limits), which are typically regulatory requirements that are defined in terms of aggregate exposure over a certain amount of time, and the aggregate exposure may be averaged over a moving integration window (or moving time window), sometimes referred to as a compliance window. For example, as shown in FIG. 3, and by reference number 310, a UE may be subject to an average power limit ($P_{limit}$) that corresponds to an average power at which an SAR exposure limit and/or an MPE (e.g., PD) limit is satisfied if the UE were to transmit substantially continuously over a moving integration window of N seconds (e.g., 100 seconds). Accordingly, as shown by reference number 320, the UE can use an instantaneous transmit power that exceeds the average power limit for a period of time provided that the average power over the moving integration window is under the average power limit at which the MPE limit is satisfied. For example, the UE may transmit at a maximum transmit power at the start of the moving integration window and then reduce the instantaneous transmit power until the moving integration window ends to ensure that the MPE limit on aggregate exposure is satisfied over the entire moving integration window. In general, as shown by reference number 330, the UE may reduce the instantaneous transmit power to a reserve power level (Preserve), which is a minimum transmit power level to maintain a link with a base station.

A wireless communication device (e.g., UE 120) may simultaneously transmit signals using multiple wireless communication technologies. For example, the wireless communication device may simultaneously transmit signals using a first wireless communication technology operating at or below 6 GHz (e.g., 3G, 4G, sub-6 GHz frequency bands of 5G, etc.) and a second wireless communication technology operating above 6 GHz (e.g., mmWave bands of 5G in 24 to 60 GHz bands, IEEE 802.11ad or 802.11ay). In certain cases, the wireless communication device may simultaneously transmit signals using the first wireless communication technology (e.g., 3G, 4G, 5G in sub-6 GHz bands, IEEE 802.11ac, etc.) in which RF exposure is measured in terms of SAR, and the second wireless communication technology (e.g., 5G in 24 to 60 GHz bands, IEEE 802.11ad, 802.11ay, etc.) in which RF exposure is measured in terms of PD. By way of example, a UE may include multiple radios, modules, and/or antennas (referred to collectively herein simply as radios for convenience) corresponding to multiple RATs and/or frequency bands, which may be more readily understood with reference to FIG. 4. Since the UE is required to satisfy all applicable RF exposure parameters, the UE may be subject to both SAR and MPE limitations, or may be subject to different RF exposure parameters for different radios, modules, or antenna bands, as described elsewhere herein.

As indicated above, FIG. 3 is described as an example. Other examples may differ from what is described with regard to FIG. 3.

Figure 4:
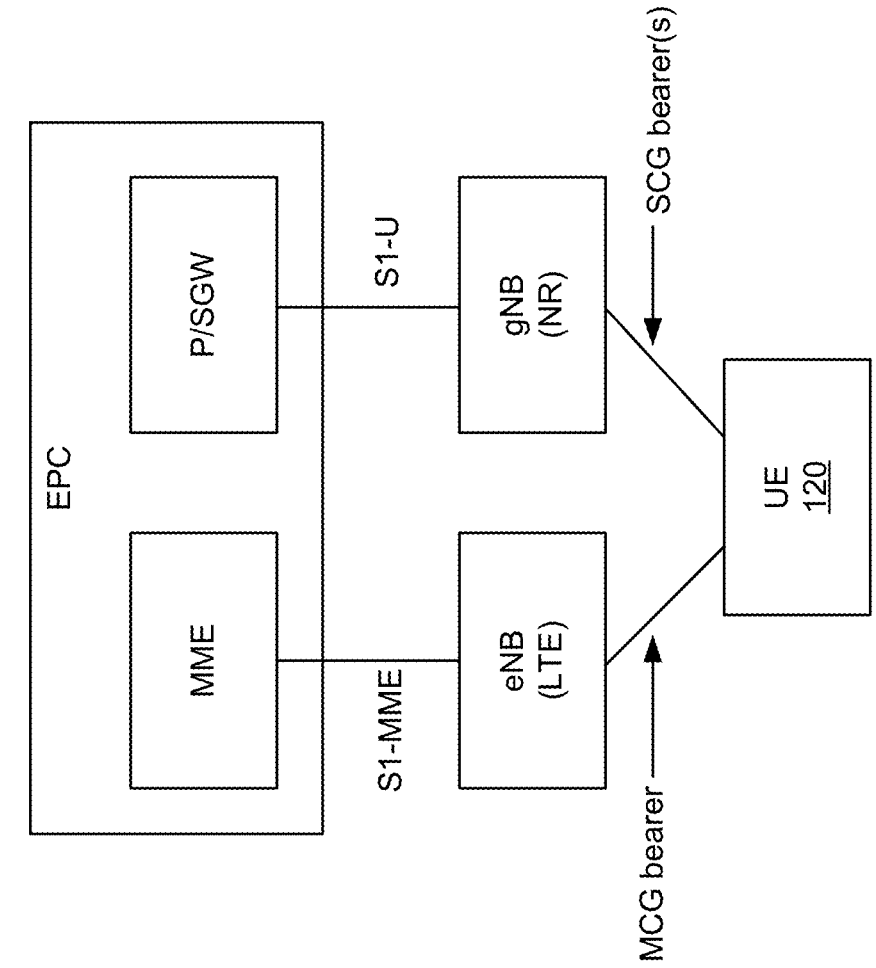
FIG. 4 is a diagram illustrating an example of dual connectivity, in accordance with the present disclosure.

FIG. 4 is a diagram illustrating an example 400 of dual connectivity, in accordance with the present disclosure. The example shown in FIG. 4 is for an Evolved Universal Mobile Telecommunications System Terrestrial Radio Access (E-UTRA)-NR dual connectivity (ENDC) mode. The ENDC mode is sometimes referred to as an NR or 5G non-standalone (NSA) mode. The ENDC mode is provided as one example of a scenario where a UE may implement multiple RAT technologies simultaneously, and thus may need to account for the RF exposure contribution of each RAT when satisfying any applicable RF exposure compliance limits. However, the described ENDC mode is provided merely as an example in which aspects of the technology may be employed, and in other aspects other dual connectivity modes and/or other multi-RAT communication technologies may be employed without departing from the scope of the disclosure.

In the ENDC mode, a UE 120 communicates using an LTE RAT on a master cell group (MCG), and the UE 120 communicates using an NR RAT on a secondary cell group (SCG). In some aspects, the UE 120 may communicate using dedicated radios, modules, and/or antennas (referred to collectively as radios for convenience) corresponding to the multiple RATs. For example, for the ENDC mode, the UE 120 may communicate via the LTE RAT using a first radio, and the UE 120 may communicate via the NR RAT using a second radio. Moreover, aspects described herein may apply to an ENDC mode (e.g., where the MCG is associated with an LTE RAT and the SCG is associated with an NR RAT), an NR-E-UTRA dual connectivity (NEDC) mode (e.g., where the MCG is associated with an NR RAT and the SCG is associated with an LTE RAT), an NR dual connectivity (NRDC) mode (e.g., where the MCG is associated with an NR RAT and the SCG is also associated with the NR RAT), or another dual connectivity mode (e.g., where the MCG is associated with a first RAT and the SCG is associated with one of the first RAT or a second RAT). Furthermore, aspects described herein may apply to a mode where the UE 120 communicates, in addition to or instead of using one or both or the LTE RAT and/or NR RAT, via one or more additional communication technologies, such as Wi-Fi, Bluetooth, IEEE 802.11ad, 802.11ay, or the like. Thus, as used herein, "dual connectivity mode" may refer to an ENDC mode, an NEDC mode, an NRDC mode, and/or another type of dual connectivity mode (e.g., communications using two or more connections via 2G, 3G, 4G, 4G LTE, 5G NR, 6G, Wi-Fi, Bluetooth, IEEE 802.11ad, 802.11ay, etc.).

Returning to the ENDC example, and as shown in FIG. 4, a UE 120 may communicate with both an eNB (e.g., a 4G base station 110) and a gNB (e.g., a 5G base station 110), and the eNB and the gNB may communicate (e.g., directly or indirectly) with a 4G/LTE core network, shown as an evolved packet core (EPC) that includes a mobility management entity (MME), a packet data network gateway (PGW), a serving gateway (SGW), and/or other devices. In FIG. 4, the PGW and the SGW are shown collectively as P/SGW. In some aspects, the eNB and the gNB may be co-located at the same base station 110. In some aspects, the eNB and the gNB may be included in different base stations 110 (e.g., may not be co-located).

As further shown in FIG. 4, in some aspects, a wireless network that permits operation in a 5G NSA mode may permit such operations using an MCG for a first RAT (e.g., an LTE RAT or a 4G RAT) and an SCG for a second RAT (e.g., an NR RAT or a 5G RAT). In this case, the UE 120 may communicate with the eNB via the MCG, and may communicate with the gNB via the SCG. In some aspects, the MCG may anchor a network connection between the UE 120 and the 4G/LTE core network (e.g., for mobility, coverage, and/or control plane information), and the SCG may be added as additional carriers to increase throughput (e.g., for data traffic and/or user plane information). In some aspects, the gNB and the eNB may not transfer user plane information between one another. In some aspects, a UE 120 operating in a dual connectivity mode may be concurrently connected with an LTE base station 110 (e.g., an eNB) and an NR base station 110 (e.g., a gNB) (e.g., in the case of ENDC or NEDC), or may be concurrently connected with one or more base stations 110 that use the same RAT (e.g., in the case of NRDC). In some aspects, the MCG may be associated with a first frequency band (e.g., a sub-6 GHz band and/or an FR1 band) and the SCG may be associated with a second frequency band (e.g., a millimeter wave band and/or an FR2 band).

The UE 120 may communicate via the MCG and the SCG using one or more radio bearers (e.g., data radio bearers (DRBs) and/or signaling radio bearers (SRBs)). For example, the UE 120 may transmit or receive data via the MCG and/or the SCG using one or more DRBs. Similarly, the UE 120 may transmit or receive control information (e.g., radio resource control (RRC) information and/or measurement reports) using one or more SRBs. In some aspects, a radio bearer may be dedicated to a specific cell group (e.g., a radio bearer may be an MCG bearer or an SCG bearer). In some aspects, a radio bearer may be a split radio bearer. A split radio bearer may be split in the uplink and/or in the downlink. For example, a DRB may be split on the downlink (e.g., the UE 120 may receive downlink information for the MCG or the SCG in the DRB) but not on the uplink (e.g., the uplink may be non-split with a primary path to the MCG or the SCG, such that the UE 120 transmits in the uplink only on the primary path). In some aspects, a DRB may be split on the uplink with a primary path to the MCG or the SCG. A DRB that is split in the uplink may transmit data using the primary path until a size of an uplink transmit buffer satisfies an uplink data split threshold. If the uplink transmit buffer satisfies the uplink data split threshold, the UE 120 may transmit data to the MCG or the SCG using the DRB.

Again, although the example 400 depicted in FIG. 4 depicts an ENDC mode as one example of how a UE 120 may utilize more than one radio and/or RAT, the disclosure is not so limited, and in other aspects the UE 120 may employ two or more radios differently than the manner described in connection with FIG. 4. For example, a UE may include multiple radios corresponding to multiple RATs and/or frequency bands. For example, the UE may be capable of communicating using various RATs, such as 2G, 3G, 4G, 4G LTE, 5G NR, 6G, Wi-Fi, Bluetooth, IEEE 802.11ad, and/or 802.11ay. Additionally, or alternatively, the UE may be capable of communication on various frequency bands within a RAT (e.g., FR1, FR2, FR3, FR4a, FR4-1, FR4, and/or FR5). For each RAT and/or frequency band, the UE may include a corresponding radio configured to communicate on that RAT and/or frequency band. Moreover, in some cases, a UE may be configured to communicate using two or more radios concurrently. For example, a UE may communicate over 5G NR while simultaneously communicating via Bluetooth or a similar RAT. As another example, the UE may communicate using multiple component carriers, such as via one or more component carriers using a first radio and via one or more other component carriers using a second radio. In such instances, each individual radio may use a certain level of allocated power to transmit communications, and collectively the transmitting radios must satisfy any applicable SAR exposure and/or MPE (e.g., PD) limitations. Thus, the techniques described herein provide power control for a plurality of communication links. A communication link can be associated with a radio, a RAT, a connection of a dual carrier (DC) mode, a component carrier, a combination thereof, or the like. For example, the techniques defined herein may provide power control for a first radio using a first RAT, a second radio using a second RAT, a third radio associated with a first component carrier of a given RAT, a fourth radio associated with a second component carrier of the given RAT, and so on.

When a UE is transmitting using more than one radio, the SAR and/or MPE contributions from each radio must collectively remain under the applicable SAR and/or MPE limits. Accordingly, for a given timeframe or compliance window, a UE may allocate a portion of the total energy available for transmission (e.g., the total energy that can be utilized by the UE while remaining under the applicable SAR and/or MPE limits) to each radio such that, collectively, the radios will not exceed the applicable SAR and/or MPE limits. Put another way, for given SAR exposure and PD limits (e.g., represented as $SAR_{lim}$ and $PD_{lim}$), the sum of the normalized SAR exposure and/or PD contributions of each radio (e.g., the SAR exposures and/or PD contribution of the radio, represented as $SAR_i$ and/or $PD_i$, divided by the applicable SAR exposure and/or PD limit, represented as $SAR_{lim}$ and/or $PD_{lim}$) must be less than or equal to one. Assuming that SAR exposure limits are applicable to radios operating in frequency bands below 6 GHz, and that MPE (e.g., PD) limits are applicable to radios operating in frequency bands above 6 GHz, the applicable SAR exposure and/or PD limits can be summarized as shown in the following equation:

$$\sum_{i=100kHz}^{6GHz} \frac{SAR_i}{SAR_{lim}} + \sum_{i=6GHz}^{300GHz} \frac{PD_i}{PD_{lim}} \leq 1.$$

To maintain power output of a UE such that the UE satisfies the above condition, a total transmission energy available to the UE for a given transmission timeframe or compliance window is allocated among the various radios so that, if the radios transmit simultaneously, the collective power output remains under the applicable SAR exposure and/or MPE (e.g., PD) limits. Allocating transmission energy in this way may be inefficient, however, because the transmission energy requirement for each radio varies over time and thus may vary within the transmission timeframe or compliance window. Thus, a radio to which only a relatively small amount of energy is allocated may experience periods during the transmission timeframe when the radio does not have enough energy allocated to perform the radio's scheduled transmissions. This may be particularly problematic for radios attempting to transmit high priority communications such as, for example, control information, voice services such as voice over internet protocol (VoIP), video services such as videotelephony and/or video-conferencing, or the like, for which a shortage of transmission energy may result in disruption of service or even link failure. Moreover, a shortage of transmission energy may result in certain radios being unable to send low priority, best effort information even when transmission energy is available for the radio to do so but the energy is assigned to another radio not requiring the energy at that time.

Conversely, a radio to which a relatively high amount of energy is allocated for a given timeframe or compliance window may experience periods when the radio is not transmitting or else is not transmitting large amounts of information. Thus, much of the transmission energy allocated to the radio may go unused. Moreover, certain radios may use the transmission energy allocated to them to transmit low priority, best effort information at the expense of other radios not being provided enough transmission energy to transmit high priority information such as control information, VoIP, video-conferencing information, or similar information. Furthermore, the determination of an appropriate energy allocation for a communication link may involve information determined by a transmitter and information determined by a medium access control (MAC) entity of the UE. If the MAC entity lacks information regarding available energy for transmission of best effort traffic, the MAC entity may be unable to effectively manage best effort traffic transmission, which may lead to decreased throughput, increased latency, and suboptimal usage of allocated energy.

As indicated above, FIG. 4 is provided as an example. Other examples may differ from what is described with respect to FIG. 4.

FIGS. 5A-5E are diagrams illustrating an example 500 of a user equipment communicating with two subscriptions, in accordance with the present disclosure. As shown in FIG. 3, a UE may communicate with a first base station, a second base station and/or a third base station. The UE, the first base station, and the second base station may be part of a first wireless network (e.g., associated with a first subscription of the UE). The UE may communicate with the first base station and/or the second base station using a first subscriber identity module (SIM). In some aspects, the UE and the third base station may be part of a second wireless network (e.g., associated with a second subscription of the UE). The UE may communicate with the third base station using a second SIM.

Figure 5A:
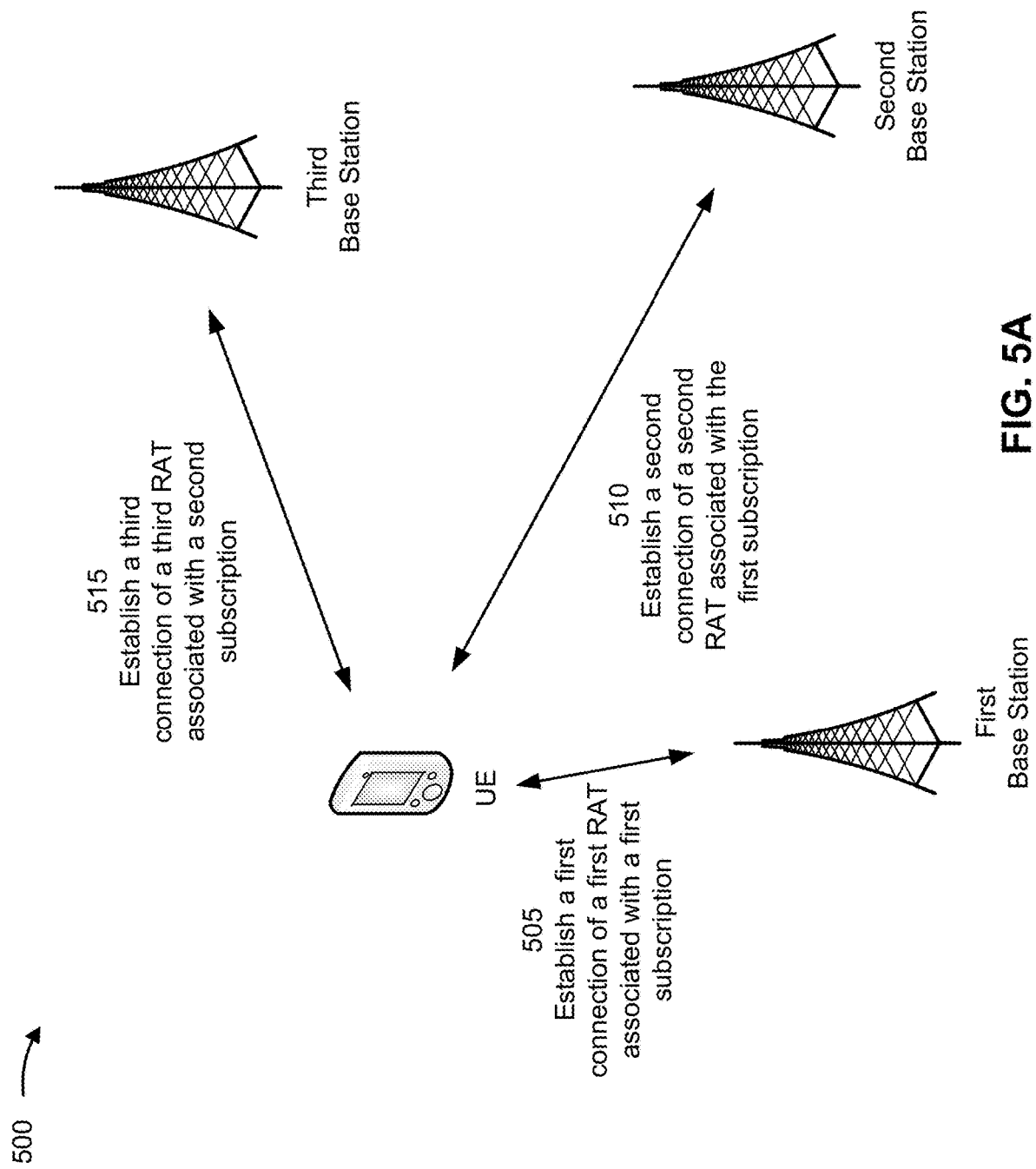
FIGS. 5A-5E are diagrams illustrating an example of a UE communicating with two subscriptions, in accordance with the present disclosure.

As shown in FIG. 5A, and by reference number 505, the UE and the first base station may establish a first connection of a first RAT associated with a first subscription associated with the UE. For example, the UE and the first base station may establish the first connection using an LTE RAT for communicating via a first SIM of the UE.

As shown by reference number 510, the UE and the second base station may establish a second connection of a second RAT associated with the first subscription associated with the UE. For example, the UE and the second base station may establish the second connection using an NR RAT for communicating via the first SIM of the UE. The first connection and the second connection may be associated with a dual connectivity mode of the UE. The first base station and the second base station may be co-located. For example, a single base station may provide service via the first connection using the first RAT and may provide service via the second connection using the second RAT.

As shown by reference number 515, the UE and the third base station may establish a third connection of a third RAT associated with a second subscription associated with the UE. For example, the UE and the third base station may establish the second connection using an LTE RAT for communicating via a second SIM of the UE.

Figure 5B:
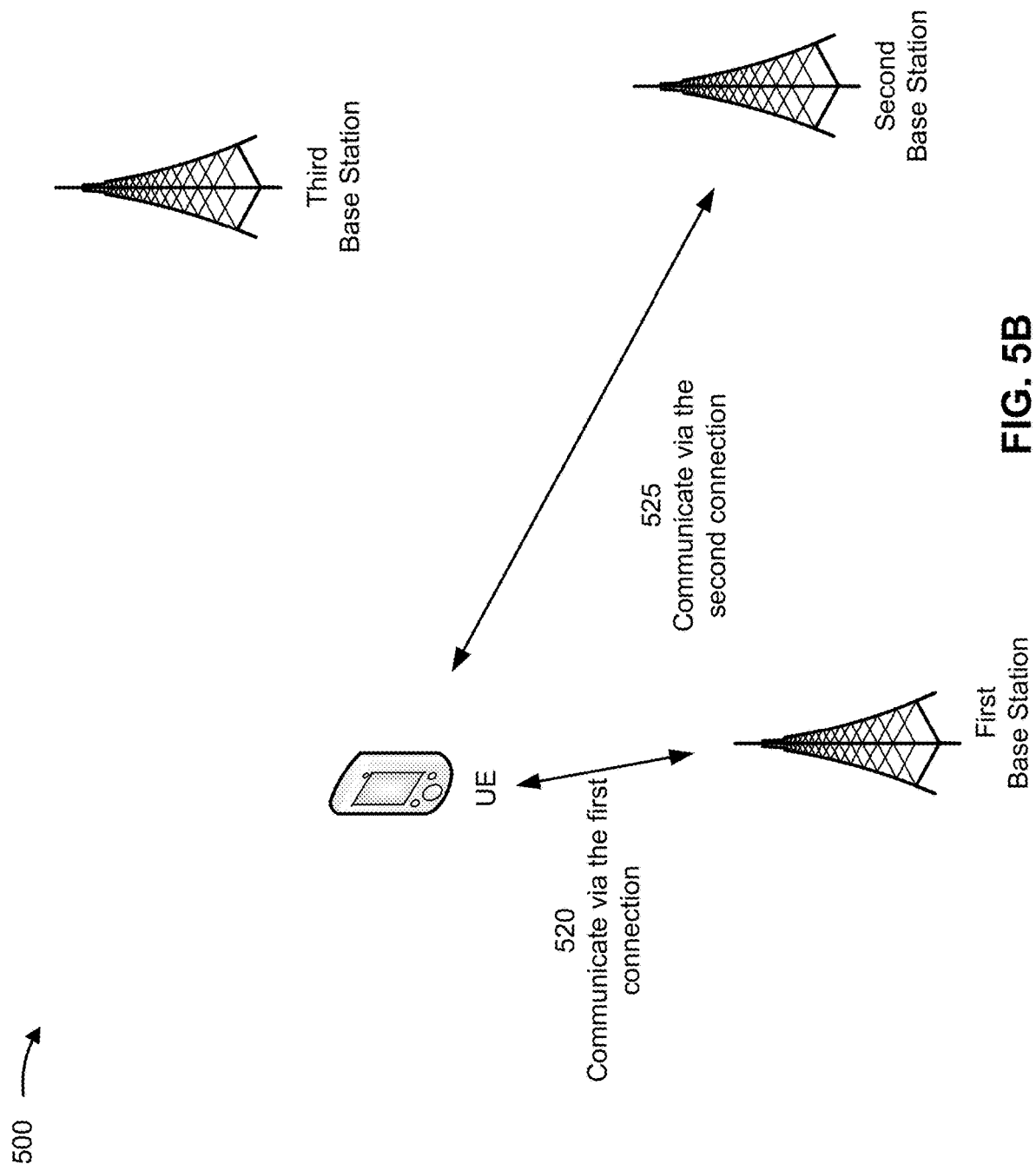

As shown in FIG. 5B, and by reference number 520, the UE may communicate via the first connection (e.g., using the first RAT). As shown by reference number 525, the UE may communicate via the second connection (e.g., using the second RAT). The UE may use a first set of values of transmission power parameters to communicate via the first connection and may use a second set of values of transmission power parameters to communicate via the second connection. The UE may be limited in transmission power based at least in part on a time averaged total radio frequency exposure (e.g., a SAR parameter or an MPE parameter, among other examples). In other words, transmission power via the second connection may be limited based at least in part on transmission power via the first connection.

Figure 5C:
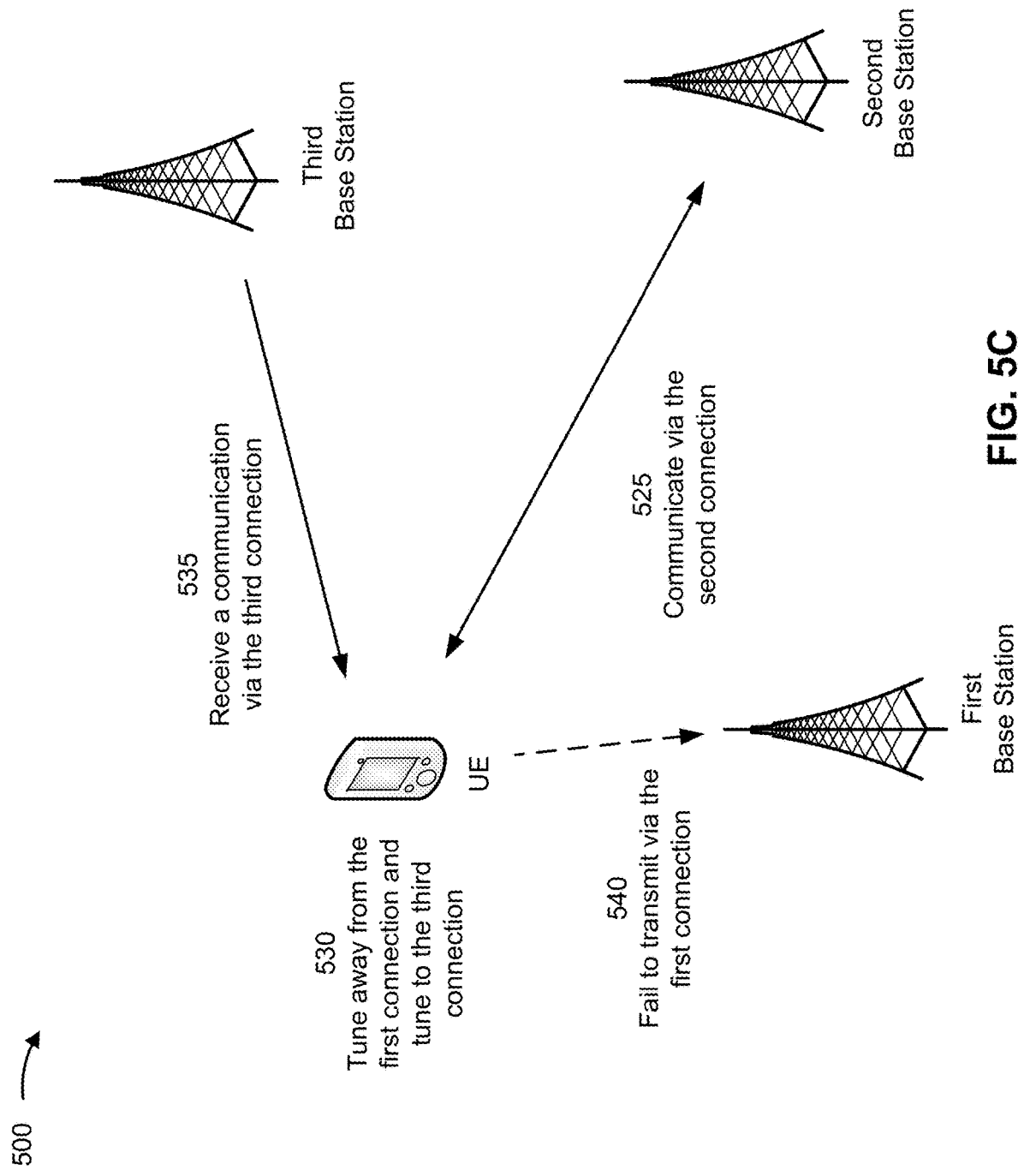

As shown by FIG. 5C, and by reference number 530, the UE may tune away from the first connection and tune to the third connection. For example, the UE may tune away from the first connection and tune to the third connection based at least in part on a page occasion associated with the third connection. The UE may tune away from the first connection by configuring one or more components of the UE to communicate using a frequency (e.g., a frequency band or frequency bandwidth part, among other examples) associated with the third connection and not the first connection. While tuned away, the UE may not receive or transmit via the first connection based at least in part on the one or more components being configured for communicating using the frequency associated with the third connection. As shown by reference number 525, the UE may continue to communicate via the second connection while tuned away from the first connection.

As shown by reference number 535, the UE may receive a communication via the third connection. For example, the UE may receive a page via the third connection.

As shown by reference number 540, the UE may fail to transmit via the first connection. For example, the UE may fail to transmit control information, one or more reference signals, or a data communication, among other examples. The UE may fail to transmit via the first connection based at least in part on the UE being tuned away from the first connection.

Figure 5D:
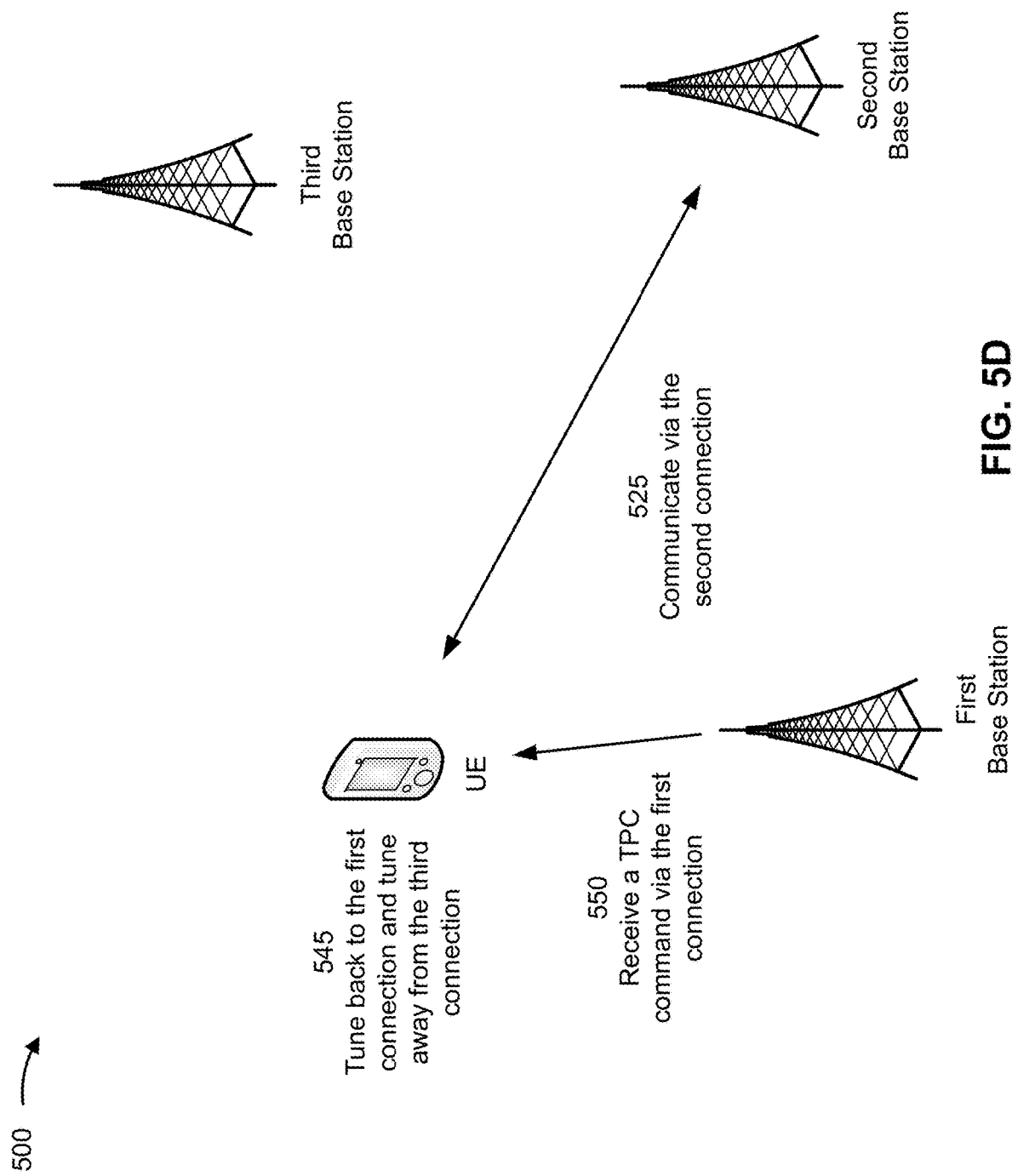

As shown in FIG. 5D, and by reference number 545, the UE may tune back to the first connection and tune away from the third connection. For example, the UE may configure the one or more components of the UE to communicated using a frequency associated with the first connection after receiving the communication via the third connection or attempting to receive the communication via the third connection.

As shown by reference number 550, the UE may receive a transmission power control (TPC) command via the first connection. The base station may transmit the TPC command based at least in part on the UE failing to transmit while the UE was tuned away. For example, the base station may determine that transmission power should be increased based at least in part on the base station failing to receive a communication from the UE that the base station expected from the UE.

Figure 5E:
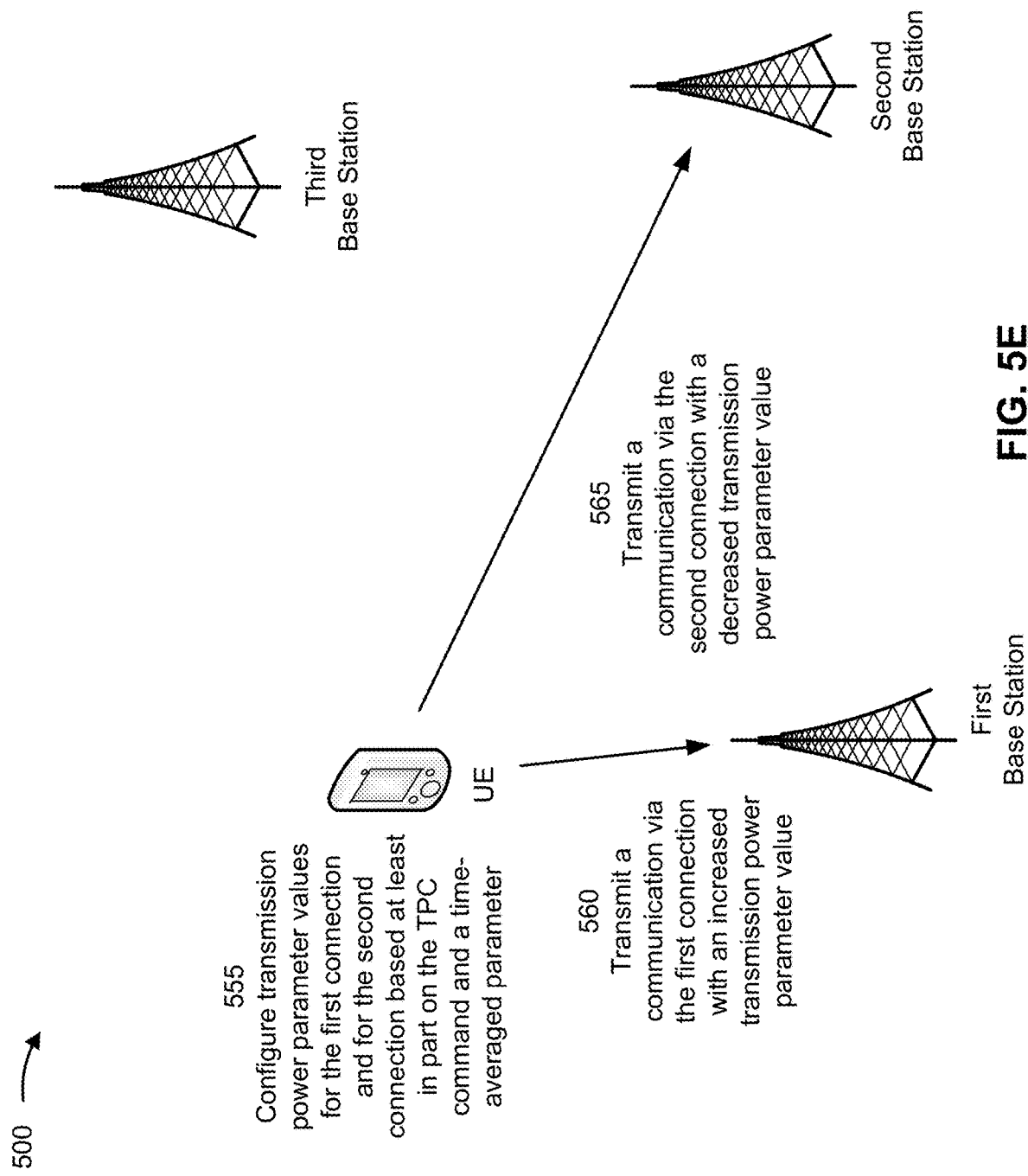

As shown in FIG. 5E, and by reference number 555, the UE may configure transmission power parameter values for the first connection and for the second connection based at least in part on the TPC command and a time-averaged parameter. For example, the UE my apply the TPC command to increase a transmission power (e.g., a transmission power parameter value) for transmitting via the first connection. Based at least in part on increasing the transmission power for the first connection, the UE may be required to decrease a transmission power for transmitting via the second connection based at least in part on a time-averaged parameter, such as an SAR parameter or an MPE parameter, among other examples.

As shown by reference number 560, the UE may transmit a communication via the first connection with an increased transmission power parameter value (e.g., transmission power). For example, the UE may transmit the communication with excessive power.

As shown by reference number 565, the UE may transmit a communication via the second connection with a decreased transmission power parameter value (e.g., transmission power). For example, the UE may transmit the communication with insufficient power.

Based at least in part on the UE configuring transmission power parameter values for the first connection and for the second connection based at least in part on the TPC command for the first connection and a time-averaged parameter, the UE may transmit the communication via the second connection with insufficient power. Transmitting the communication via the second connection with insufficient power may cause the second base station to fail to receive the communication. Based at least in part on the second base station failing to receive the communication, the UE and the second base station may consume computing power, communication, and/or network resources to detect and/or correct the failure, to signal a TPC command to increase power for the second connection, and/or to determine whether power can be reduced for transmissions via the first connection to satisfy the time-averaged parameter. For example, based at least in part on increasing power of a transmission on the second connection, the UE may consume power budgeted for a transmission via the first connection and/or the third connection.

As indicated above, FIGS. 5A-5E are provided as an example. Other examples may differ from what is described with regard to FIGS. 5A-5E.

In some aspects described herein, a UE may establish a first connection of a first RAT associated with a first subscription of the UE, a second connection of a second RAT associated with the first subscription of the UE, and a third connection of a third RAT (that may be the same as the first RAT) associated with a second subscription of the UE. The UE may tune away from the first connection to attempt to receive a communication via the third connection. While tuned away, the UE may fail to transmit a communication via the first connection. After attempting to receive the communication via the third connection, the UE may tune back to the first connection and may receive one or more TPC commands (e.g., to increase a transmission power). The UE may configure a transmission power parameter of the first connection based at least in part on a time-averaged parameter. In some aspects, the time-averaged parameter is associated with a maximum transmission power limit (MTPL).

In some aspects, the UE may configure the transmission power parameter of the first connection based at least in part on applying a limit (e.g., a cap) value for an initial number of subframes, which may be based at least in part on a number of subframes during which the UE is tuned away from the first connection. In some aspects, the UE may use pathloss measurements before and after tuning away, determine a difference between the pathloss measurements, and apply the MTPL based at least in part on the difference between the pathloss measurements.

In some aspects, the UE may reduce or cap an MTPL for physical uplink shared channel (PUSCH) transmissions and may not limit or cap an MTPL for physical uplink control channel (PUCCH) transmissions (e.g., for the initial number of subframes). In some aspects, the UE may apply TPC controls, as indicated by an associated base station, to the PUCCH. In this way, the UE may improve coverage of control channel communications and, based at least in part on control channel communications having a ratio of power that is less than that of a data channel, the control channel communications will have only a minor effect on a time-average power budget.

The MTPL indicates an amount of radiation, energy, or power that a wireless communication device is allowed to generate within a time window. In some aspects, the time window may be a rolling window that limits a power (a Plimit) for any continuous time having a length that is defined by a time window length parameter.

In some aspects, the UE may apply techniques to conform with the Plimit or other regulatory transmission power limit for a given window interval as defined by a regulatory body or specification. The techniques may include applying power to transmissions such that an average transmission power asymptotically approaches the Plimit or other regulatory transmission power limit for the given window interval. In some aspects, the UE may configure MTPLs for connections, carriers, RATs, and/or subscriptions, among other examples based at least in part on a remaining amount of power allowed based at least in part on the Plimit. For example, power saving for a given subframe may be used to increase transmission power for a subsequent transmission. In this way, the UE may conform to the Plimit and may improve coverage of transmissions (e.g., best effort transmission).

Some techniques and apparatuses described herein provide dynamic energy reservation for a plurality of communication links, such as a plurality of radios or the like. The dynamic energy reservation may provide sufficient transmit power to support high priority and control traffic while maintaining SAR, MPE, or other applicable RF exposure metrics under applicable compliance limits. A UE may allocate an amount of energy for a communication link, which may include at least as much energy as the dynamic energy reservation for the communication link. A transmitter to which the amount of energy is allocated may report remaining energy (after the dynamic energy reservation is accounted for) to a MAC entity of the UE, such that the MAC entity can adjust a transmit data buffer status. In this way, the UE can ensure that high priority traffic, such as control traffic and certain data communications, have sufficient energy for transmission. Furthermore, the MAC entity can selectively throttle best effort traffic using a buffer status based at least in part on remaining energy for the best effort traffic after the high priority traffic is accounted for. As a result, the UE more-efficiently allocates transmission energy resources while remaining within applicable SAR exposure and/or MPE (e.g., PD) limits, resulting in increased throughput, decreased latency, and more reliable service.

In some aspects, based at least in part on the UE determining that applying the one or more TPC commands would require a reduction of a transmission power parameter of the second connection, the UE may ignore the one or more TPC commands and/or may apply an MTPL (e.g., a reduced MTPL) to the first connection. In some aspects, based at least in part on the UE determining that applying the one or more TPC commands would not require a reduction of a transmission power parameter of the second connection (e.g., based at least in part on a Plimit), the UE may apply the one or more TPC commands. In some aspects, the UE may ignore a configured number of TPC commands, may ignore TPC commands and/or apply the MTPL to the first connection for a configured number of subframes, or may ignore TPC commands for a configured amount of time, among other examples. In some aspects, the UE may ignore TPC commands and/or apply the MTPL to the first connection for only data channel transmissions or for data channel transmission and for control channel transmissions, among other examples.

In some aspects, the UE may determine a configuration for the transmission power parameter (e.g., a value for the transmission power parameter) based at least in part on reverting to a configuration of the transmission power parameter used for the first connection before tuning away from the first connection. In some aspects, the UE may determine to modify the configuration of the transmission power parameter used for the first connection before tuning away from the first connection based at least in part on an open loop measurement (e.g., an RSRP and/or a PL RS measurement).

Based at least in part on the UE configuring a transmission power parameter of the first connection based at least in part on a time-averaged parameter, the UE may reduce a likelihood of the UE transmitting a communication via the second connection with insufficient power. In this way, the UE and the second base station may conserve computing power, communication, and/or network resources that may otherwise be used to detect and/or correct a failure of the second base station to receive the communication, to signal a TPC command to increase power for the second connection, and/or to determine whether power can be reduced for transmissions via the first connection to satisfy the time-averaged parameter.

Figure 6:
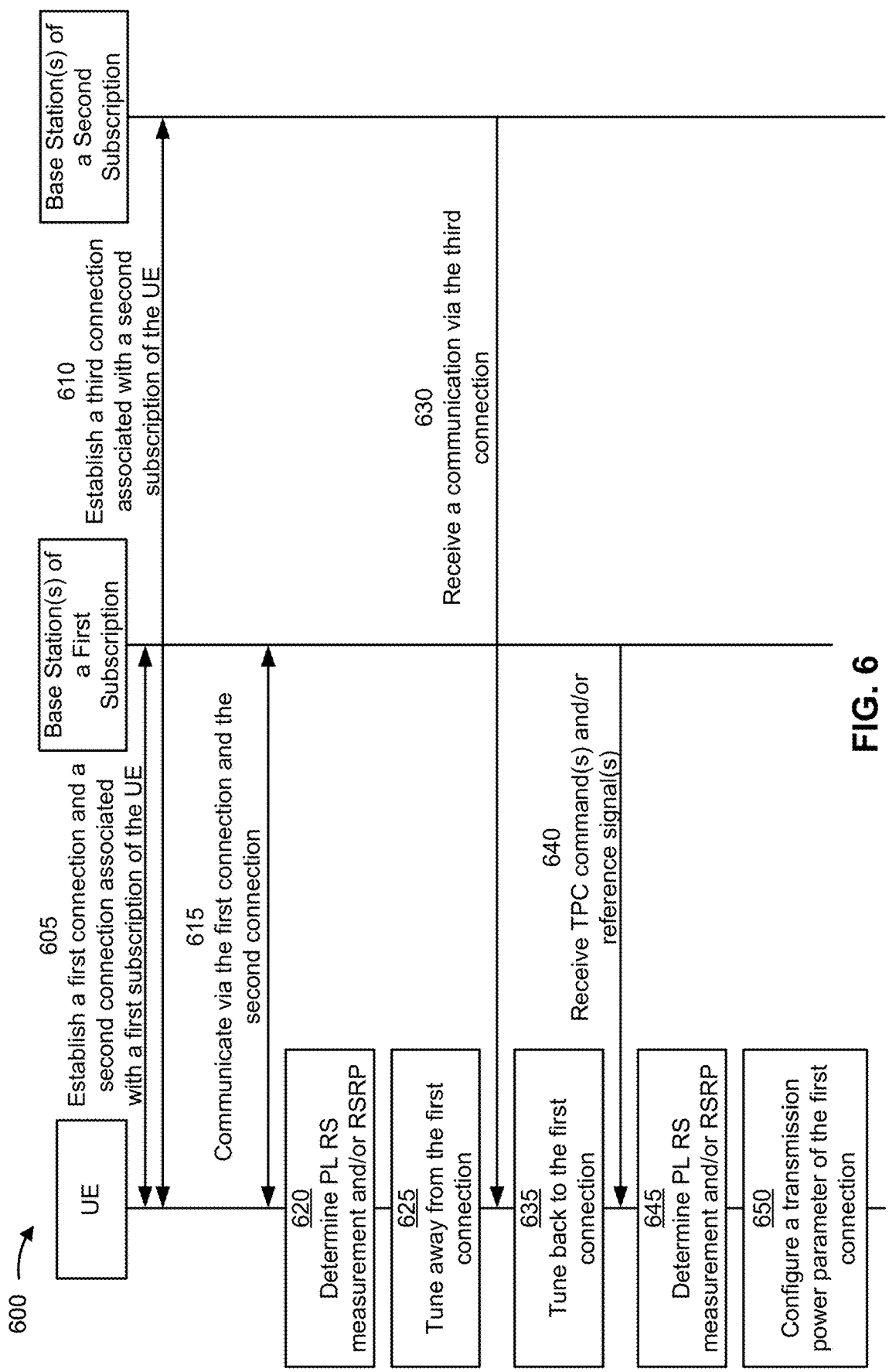
FIG. 6 is a diagram illustrating an example associated with configuring a transmission power parameter after tuning back to a subscription in a dual connectivity mode, in accordance with the present disclosure.

FIG. 6 is a diagram illustrating an example 600 associated with configuring a transmission power parameter after tuning back to a subscription in a dual connectivity mode, in accordance with the present disclosure. As shown in FIG. 6, a UE (e.g., UE 120) may communicate with one or more base stations (e.g., base station 110) of a first subscription and with one or more base stations (e.g., base station 110) of a second subscription. In some aspects, the UE and the one or more base stations of the first subscription may be part of a first wireless network (e.g., wireless network 100), and the UE and the one or more base stations of the second subscription may be part of a second wireless network (e.g., wireless network 100).

As shown by reference number 605, the UE may establish a first connection and a second connection associated with a first subscription of the UE. For example, the UE may establish the first connection of a first RAT associated with the first subscription of the UE and may establish the second connection of a second RAT associated with the first subscription of the UE. In some aspects, the UE may establish the first connection and the second connection as part of a dual connectivity mode (e.g., ENDC mode) connection associated with the first subscription of the UE.

In some aspects, the first base station and the second base station may be co-located. For example, a single base station, of the one or more base stations, may provide service via the first connection using the first RAT and may provide service via the second connection using the second RAT.

In some aspects, the UE may simultaneously communicate via both of the first connection and the second connection. For example, the UE may tune a first set of components of the UE to communicate via the first connection and may tune a second set of components of the UE to communicate via the second connection.

As shown by reference number 610, the UE may establish a third connection associated with a second subscription of the UE. In some aspects, the UE may use a same set of components to communicate via the first connection and the third connection. In this way, the UE may be unable to communicate via the third connection without tuning away from the first connection.

As shown by reference number 615, the UE may communicate via the first connection and the second connection. The UE may configure a transmission power parameter for the first connection based at least in part on one or more TPC commands received from a base station, associated with the first connection, of the one or more base station of the first subscription. The UE may similarly configure a transmission power parameter for the second connection based at least in part on one or more TPC commands received from a base station, associated with the second connection, of the one or more base station of the first subscription. The UE may further configure the transmission power parameters for the first connection and the second connection based at least in part on a time-averaged parameter (e.g., an SAR or an MPE, among other examples).

As shown by reference number 620, the UE may determine a PL RS measurement and/or an RSRP associated with the first connection and/or the second connection. In some aspects, the UE may measure the PL RS and/or the RSRP for the first connection based at least in part on determining that the UE is to tune away from the first connection to attempt to receive a communication via the third connection. In some aspects, the UE may store a measurement of the PL RS and/or the RSRP based at least in part on the UE tuning away from the first connection.

As shown by reference number 625, the UE may tune away from the first connection. For example, the UE may tune away from the first connection to receive a communication via the third connection. The UE may configure one or more components of the UE to communicate via a frequency (e.g., frequency band or bandwidth part, among other examples) to communicate via the third connection. Based at least in part on the UE tuning away from the first connection, the UE is unable to communicate via the first connection.

As shown by reference number 630 the UE may receive a communication via the third connection. For example, the UE may receive a page, one or more reference signals or a synchronization signal block, among other examples.

As shown by reference number 635, the UE may tune back to the first connection. For example, the UE may configure one or more components of the UE to communicate via a frequency to communicate via the first connection. Based at least in part on the UE tuning back to the first connection, the UE is able to communicate via the first connection and may be unable to communicate via the third connection.

As shown by reference number 640, the UE may receive one or more TPC commands and/or reference signals from a base station, of the one or more base stations of the first subscription, associated with the first subscription. In some aspects, the UE may receive the one or more TPC commands based at least in part on the UE failing to transmit, and the base station failing to receive, one or more communications expected from the UE.

In some aspects, the UE may determine whether to apply (e.g., apply) the one or more TPC commands based at least in part on a determination of whether applying the one or more transmission power control commands would impose a limit on a transmission power parameter for transmitting via the second connection. For example, the UE may determine to ignore the one or more TPC commands based at least in part on a determination that applying the one or more transmission power control commands would impose a limit on a transmission power parameter for transmitting via the second connection.

As shown by reference number 645, the UE may determine a PL RS measurement and/or an RSRP for the first connection after tuning back to the first connection. In some aspects, the UE may determine a difference between the PL RS measurement and/or the RSRP from before tuning away from the first connection and the PL RS measurement and/or the RSRP from after tuning away from the first connection.

In some aspects, the UE may determine to modify a transmission power parameter used before tuning away based at least in part on the difference. In some aspects, the UE may determine to modify the value of the transmission power parameter based at least in part on the difference between the first PL RS and the second PL RS satisfying a PL RS change threshold and/or based at least in part on the difference between the first RSRP and the second RSRP satisfying an RSRP change threshold. In some aspects, an among to modify the value may be based at least in part on the difference between the first PL RS and the second PL RS and/or based at least in part on the difference between the first RSRP and the second RSRP.

As shown by reference number 650, the UE may configure a transmission power parameter of the first connection. In some aspects, the UE may configure a transmission power parameter of the first connection based at least in part on a time-averaged parameter. For example, the UE may configure the transmission power parameter based at least in part on an MTPL, an SAR parameter, or MPE parameter, among other examples, that limit a total transmission power for the first connection and the second connection. The UE may configure the transmission power parameter for the first connection based at least in part on whether application of the one or more TPC commands and the SAR parameter or MPE parameter would require decreasing a transmission power parameter of the second connection.

In some aspects, the UE may determine to ignore the one or more TPC commands received for the first connection. The UE may determine to ignore a configured number of TPC commands (e.g., 3 TPC commands) after tuning back to the first connection, to ignore a TPC commands for a configured number of subframes after tuning back to the first connection and/or to ignore a TPC commands for a configured amount of time after tuning back to the first connection, among other examples.

In some aspects, the UE may determine a transmission power after tuning back to the first connection, with the transmission power based at least in part on an MTPL. The MTPL may be based at least in part on a transmission power configured (e.g., in use) before tuning away from the first connection. The MTPL may be configured for a number of subframes after tuning back to the first connection and/or for a configured amount of time after tuning back to the first connection, among other examples. In some aspects, the UE may determine to configure the transmission power based at least in part on determining the PL RS measurement and/or the RSRP as described in connection with reference number 645.

In some aspects, the UE may configure the transmission power parameter of the first connection based at least in part on reverting back to the configuration of the transmission power parameter used for the first connection before tuning away from the first connection. In some aspects, the UE may determine to modify the configuration of the transmission power parameter used for the first connection before tuning away based at least in part on a change in PL RS measurement and/or an RSRP measurement, as described herein.

In some aspects, the UE may configure the transmission power parameter for transmitting via a data channel of the first connection based at least in part on ignoring one or more transmission power control commands received for the first connection after tuning back to the first connection, or based at least in part on configuring the MTPL based at least in part on a transmission power parameter used before tuning away from the first connection. In some aspects, the UE may configure the transmission power parameter for transmitting via a control channel of the first connection based at least in part on applying the one or more transmission power control commands received for the first connection after tuning back to the first connection. Alternatively, the UE may configure the transmission power parameter for transmitting via the data channel and the control channel of the first connection based at least in part on ignoring one or more transmission power control commands received for the first connection after tuning back to the first connection.

Based at least in part on the UE configuring the transmission power parameter of the first connection based at least in part on a time-averaged parameter, a configuration of the transmission power parameter before tuning away, and/or a determination of whether to ignore a TPC command, the UE may reduce a likelihood of the UE transmitting a communication via the second connection with insufficient power. In this way, the UE and the second base station may conserve computing power, communication, and/or network resources that may otherwise be used to detect and/or correct a failure of the second base station to receive the communication, to signal a TPC command to increase power for the second connection, and/or to determine whether power can be reduced for transmissions via the first connection to satisfy the time-averaged parameter.

As indicated above, FIG. 6 is provided as an example. Other examples may differ from what is described with respect to FIG. 6.

Figure 7:
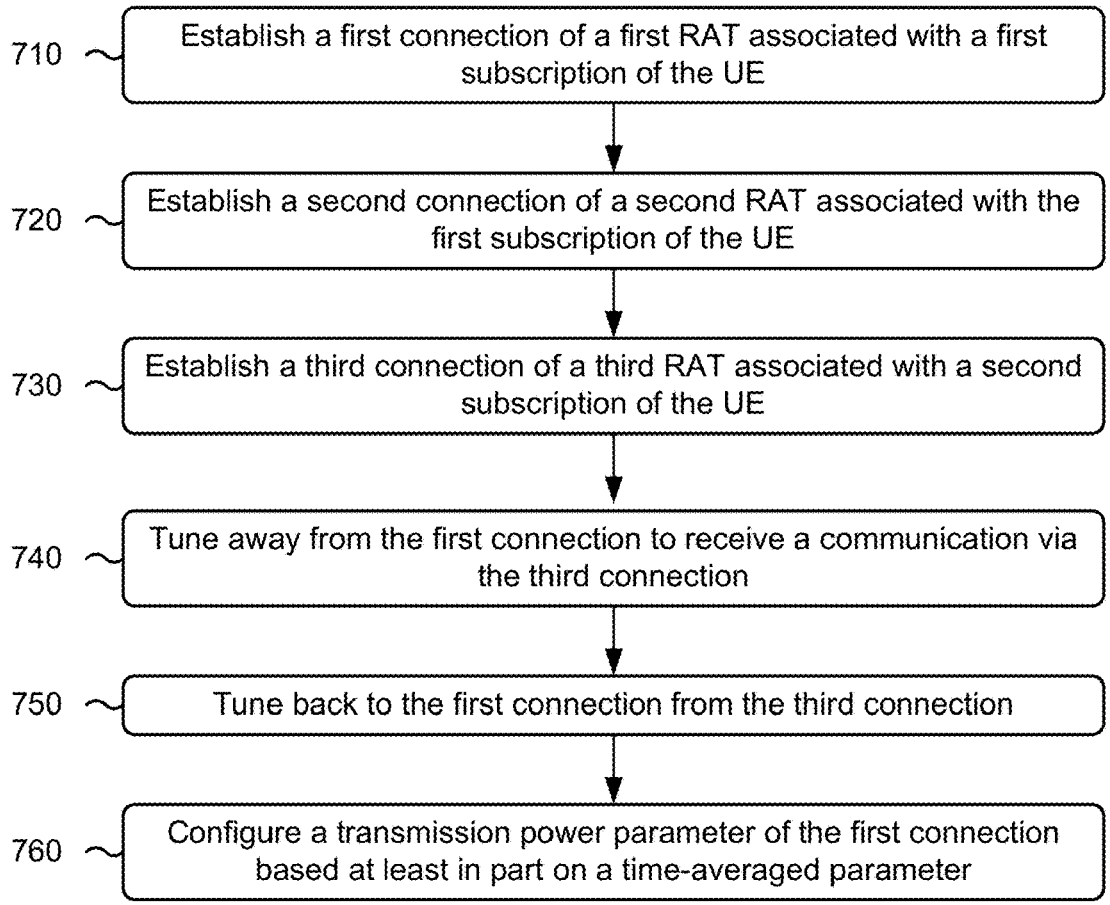
FIG. 7 is a diagram illustrating an example process associated with configuring a transmission power parameter after tuning back to a subscription in a dual connectivity mode, in accordance with the present disclosure.

FIG. 7 is a diagram illustrating an example process 700 performed, for example, by a UE, in accordance with the present disclosure. Example process 700 is an example where the UE (e.g., UE 120) performs operations associated with techniques for configuring a transmission power parameter after tuning back to a subscription in a dual connectivity mode.

As shown in FIG. 7, in some aspects, process 700 may include establishing a first connection of a first RAT associated with a first subscription of the UE (block 710). For example, the UE (e.g., using communication manager 808, depicted in FIG. 7) may establish a first connection of a first RAT associated with a first subscription of the UE, as described above.

As further shown in FIG. 7, in some aspects, process 700 may include establishing a second connection of a second RAT associated with the first subscription of the UE (block 720). For example, the UE (e.g., using communication manager 808, depicted in FIG. 8) may establish a second connection of a second RAT associated with the first subscription of the UE, as described above.

As further shown in FIG. 7, in some aspects, process 700 may include establishing a third connection of a third RAT associated with a second subscription of the UE (block 730). For example, the UE (e.g., using communication manager 808, depicted in FIG. 8) may establish a third connection of a third RAT associated with a second subscription of the UE, as described above.

As further shown in FIG. 7, in some aspects, process 700 may include tuning away from the first connection to receive a communication via the third connection (block 740). For example, the UE (e.g., using reception component 802 and/or transmission component 804, depicted in FIG. 8) may tune away from the first connection to receive a communication via the third connection, as described above.

As further shown in FIG. 7, in some aspects, process 700 may include tuning back to the first connection from the third connection (block 750). For example, the UE (e.g., using reception component 802 and/or transmission component 804, depicted in FIG. 8) may tune back to the first connection from the third connection, as described above.

As further shown in FIG. 7, in some aspects, process 700 may include configuring a transmission power parameter of the first connection based at least in part on a time-averaged parameter (block 760). For example, the UE (e.g., using communication manager 808 and/or transmission component 804, depicted in FIG. 8) may configure a transmission power parameter of the first connection based at least in part on a time-averaged parameter, as described above.

Process 700 may include additional aspects, such as any single aspect or any combination of aspects described below and/or in connection with one or more other processes described elsewhere herein.

In a first aspect, the configuration of the transmission power parameter comprises applying an MTPL to the first connection, wherein the MTPL is based at least in part on an energy budget for the UE.

In a second aspect, alone or in combination with the first aspect, applying the MTPL to the first connection comprises applying the MTPL to the first connection for a configured number of subframes after tuning back to the first connection.

In a third aspect, alone or in combination with one or more of the first and second aspects, applying the MTPL to the first connection comprises applying the MTPL to the first connection for a configured amount of time after tuning back to the first connection.

In a fourth aspect, alone or in combination with one or more of the first through third aspects, configuration of the transmission power parameter comprises reverting to a configuration of the transmission power parameter used for the first connection before tuning away from the first connection.

In a fifth aspect, alone or in combination with one or more of the first through fourth aspects, process 700 includes measuring one or more of a first PL RS or a first RSRP before tuning away from the first connection, measuring one or more of a second PL RS measurement or a second RSRP after tuning back to the first connection, and applying, based at least in part on one or more of a difference between the first PL RS and the second PL RS or a difference between the first RSRP and the second RSRP, a modification to an MTPL used for the first connection before tuning away from the first connection.

In a sixth aspect, alone or in combination with one or more of the first through fifth aspects, application, based at least in part on one or more of the difference between the first PL RS and the second PL RS or the difference between the first RSRP and the second RSRP, of the modification to the value of the MTPL used for the first connection before tuning away from the first connection comprises application of the modification to value of the MTPL based at least in part on the difference between the first PL RS and the second PL RS satisfying a PL RS change threshold or the difference between the first RSRP and the second RSRP satisfying an RSRP change threshold.

In a seventh aspect, alone or in combination with one or more of the first through sixth aspects, process 700 includes determining one or more of a first PL RS measurement or a first RSRP before tuning away from the first connection, determining one or more of a second PL RS measurement or a second RSRP after tuning back to the first connection, and determining, based at least in part on one or more of a difference between the first PL RS and the second PL RS or a difference between the first RSRP and the second RSRP, to modify a value of the transmission power parameter used for the first connection before tuning away from the first connection.

In an eighth aspect, alone or in combination with one or more of the first through seventh aspects, configuration of the transmission power parameter of the first connection comprises configuring the transmission power parameter for transmitting via a data channel of the first connection based at least in part on applying a first MTPL for the first connection after tuning back to the first connection, and configuring the transmission power parameter for transmitting via a control channel of the first connection based at least in part on applying a second MTPL for the first connection after tuning back to the first connection.

In a ninth aspect, alone or in combination with one or more of the first through eighth aspects, the first MTPL is less than the second MTPL.

In a tenth aspect, alone or in combination with one or more of the first through ninth aspects, establishment of the first connection and establishment of the second connection comprises establishment of a dual connectivity mode connection associated with the first subscription of the UE.

In an eleventh aspect, alone or in combination with one or more of the first through tenth aspects, the time averaged parameter comprises one or more of a specific absorption rate parameter, or a maximum permissible exposure parameter.

In a twelfth aspect, alone or in combination with one or more of the first through eleventh aspects, the configuration of the transmission power parameter comprises ignoring one or more transmission power control commands received for the first connection.

In a thirteenth aspect, alone or in combination with one or more of the first through twelfth aspects, ignoring of one or more transmission power control commands received for the first connection comprises ignoring a configured number of transmission power control commands received after tuning back to the first connection.

In a fourteenth aspect, alone or in combination with one or more of the first through thirteenth aspects, ignoring of one or more transmission power control commands received for the first connection comprises ignoring one or more transmission power control commands received within a configured number of subframes after tuning back to the first connection.

In a fifteenth aspect, alone or in combination with one or more of the first through fourteenth aspects, ignoring of one or more transmission power control commands received for the first connection comprises ignoring one or more transmission power control commands received within a configured amount of time after tuning back to the first connection.

In a sixteenth aspect, alone or in combination with one or more of the first through fifteenth aspects, the determination, based at least in part on one or more of the difference between the first PL RS and the second PL RS or the difference between the first RSRP and the second RSRP, to modify the value of the transmission power parameter used for the first connection before tuning away from the first connection comprises determining to modify the value of the transmission power parameter based at least in part on the difference between the first PL RS and the second PL RS satisfying a PL RS change threshold or the difference between the first RSRP and the second RSRP satisfying an RSRP change threshold.

In a seventeenth aspect, alone or in combination with one or more of the first through sixteenth aspects, configuration of the transmission power parameter of the first connection comprises configuring the transmission power parameter for transmitting via a data channel of the first connection based at least in part on ignoring one or more transmission power control commands received for the first connection after tuning back to the first connection, and configuring the transmission power parameter for transmitting via a control channel of the first connection based at least in part on applying the one or more transmission power control commands received for the first connection after tuning back to the first connection.

In an eighteenth aspect, alone or in combination with one or more of the first through seventeenth aspects, process 700 includes receiving, after tuning back to the first connection, one or more transmission power control commands for the first connection, and ignoring the one or more transmission power control commands based at least in part on a determination that applying the one or more transmission power control commands would impose a limit on a transmission power parameter for transmitting via the second connection.

In a nineteenth aspect, alone or in combination with one or more of the first through eighteenth aspects, process 700 includes receiving, after tuning back to the first connection, one or more transmission power control commands for the first connection, and applying the one or more transmission power control commands based at least in part on a determination that applying the one or more transmission power control commands would not impose a limit on a transmission power parameter for transmitting via the second connection.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
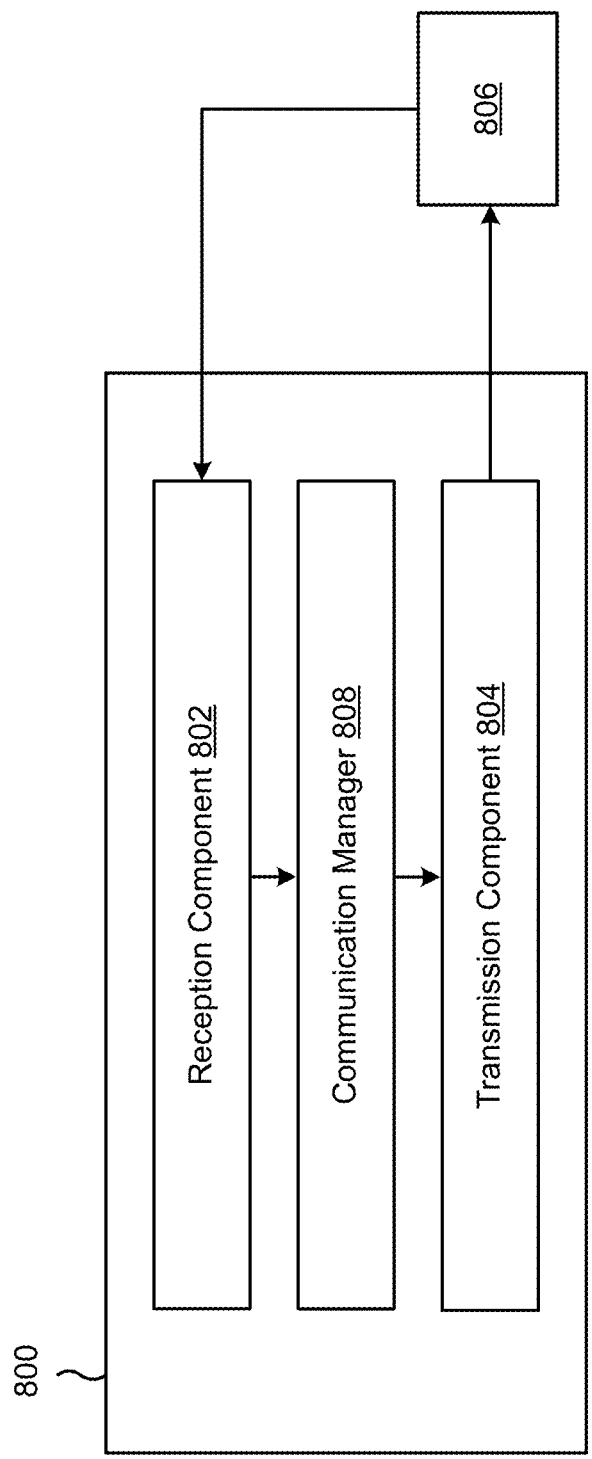
FIGS. 8 and 9 are block diagrams of example apparatuses for wireless communication, in accordance with the present disclosure.

FIG. 8 is a block diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include a communication manager 808.

In some aspects, the apparatus 800 may be configured to perform one or more operations described herein in connection with FIG. 6. Additionally, or alternatively, the apparatus 800 may be configured to perform one or more processes described herein, such as process 700 of FIG. 7. In some aspects, the apparatus 800 and/or one or more components shown in FIG. 8 may include one or more components of the UE described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a demodulator, a MIMO detector, a receive processor, a controller/processor, a memory, or a combination thereof, of the UE described above in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the UE described above in connection with FIG. 2. In some aspects, the transmission component 804 may be co-located with the reception component 802 in a transceiver.

The communication manager 808 may establish a first connection of a first RAT associated with a first subscription of the UE. The communication manager 808 may establish a second connection of a second RAT associated with the first subscription of the UE. The communication manager 808 may establish a third connection of a third RAT associated with a second subscription of the UE. The reception component 802 and/or transmission component 804 may tune away from the first connection to receive a communication via the third connection. The reception component 802 and/or transmission component 804 may tune back to the first connection from the third connection. The communication manager 808 and/or transmission component 804 may configure a transmission power parameter of the first connection based at least in part on a time-averaged parameter.

The communication manager 808 may determine one or more of a first PL RS measurement or a first RSRP before tuning away from the first connection.

The communication manager 808 may determine one or more of a second PL RS measurement or a second RSRP after tuning back to the first connection.

The communication manager 808 may determine, based at least in part on one or more of a difference between the first PL RS and the second PL RS or a difference between the first RSRP and the second RSRP, to modify a value of the transmission power parameter used for the first connection before tuning away from the first connection.

The reception component 802 may receive, after tuning back to the first connection, one or more transmission power control commands for the first connection.

The communication manager 808 may ignore the one or more transmission power control commands based at least in part on a determination that applying the one or more transmission power control commands would impose a limit on a transmission power parameter for transmitting via the second connection.

The reception component 802 may receive, after tuning back to the first connection, one or more transmission power control commands for the first connection.

The communication manager 808 may apply the one or more transmission power control commands based at least in part on a determination that applying the one or more transmission power control commands would not impose a limit on a transmission power parameter for transmitting via the second connection.

The communication manager 808 may measure one or more of a first PL RS or a first RSRP before tuning away from the first connection.

The communication manager 808 may measure one or more of a second PL RS measurement or a second RSRP after tuning back to the first connection.

The communication manager 808 may apply, based at least in part on one or more of a difference between the first PL RS and the second PL RS or a difference between the first RSRP and the second RSRP, a modification to a MTPL used for the first connection before tuning away from the first connection.

The communication manager 808 may determine one or more of a first PL RS measurement or a first RSRP before tuning away from the first connection.

The communication manager 808 may determine one or more of a second PL RS measurement or a second RSRP after tuning back to the first connection.

The communication manager 808 may determine, based at least in part on one or more of a difference between the first PL RS and the second PL RS or a difference between the first RSRP and the second RSRP, to modify a value of the transmission power parameter used for the first connection before tuning away from the first connection.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
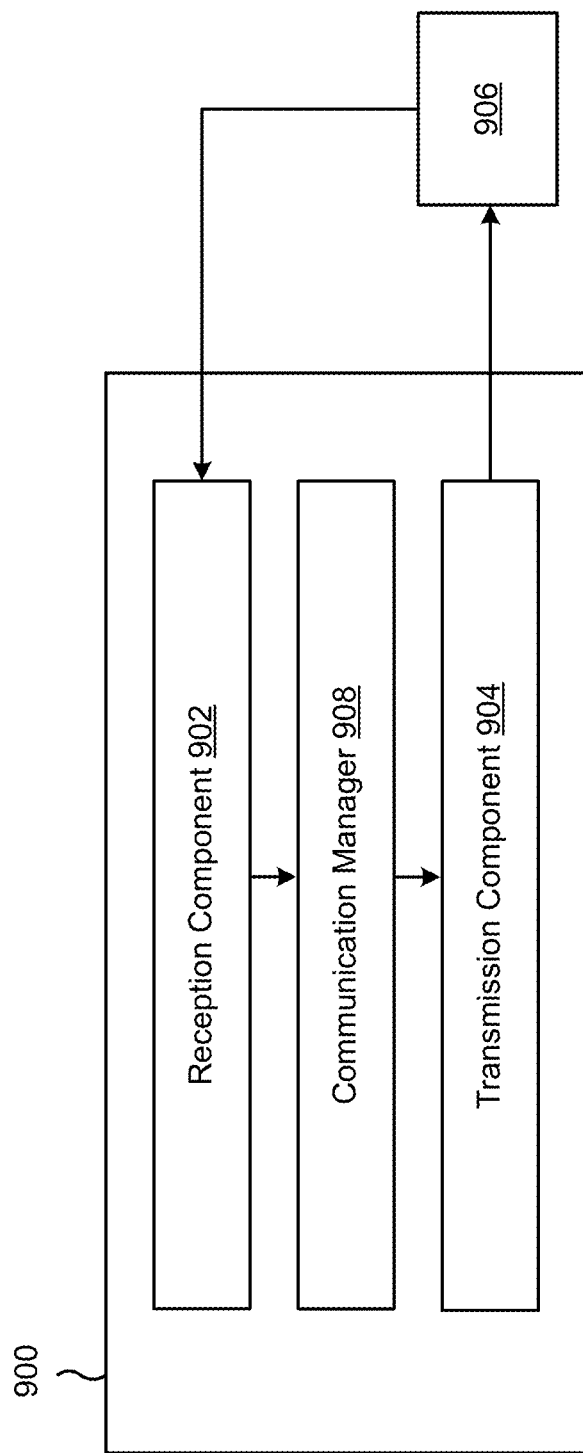

FIG. 9 is a block diagram of an example apparatus 900 for wireless communication. The apparatus 900 may be a base station, or a base station may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include a communication manager 908.

In some aspects, the apparatus 900 may be configured to perform one or more operations described herein in connection with FIG. 6. Additionally, or alternatively, the apparatus 900 may be configured to perform one or more processes described herein. In some aspects, the apparatus 900 and/or one or more components shown in FIG. 9 may include one or more components of the base station described above in connection with FIG. 2. Additionally, or alternatively, one or more components shown in FIG. 9 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a demodulator, a MIMO detector, a receive processor, a controller/processor, a memory, or a combination thereof, of the base station described above in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modulator, a transmit MIMO processor, a transmit processor, a controller/processor, a memory, or a combination thereof, of the base station described above in connection with FIG. 2. In some aspects, the transmission component 904 may be co-located with the reception component 902 in a transceiver.

The communication manager 908 may establish a connection with the UE. The communication manager may determine one or more TPC commands to control a transmission power parameter of the UE for communicating with the apparatus 900. The transmission component 904 may transmit one or more TPC commands to the UE (e.g., based at least in part on failing to receive a communication from the UE).

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: establishing a first connection of a first radio access technology (RAT) associated with a first subscription of the UE; establishing a second connection of a second RAT associated with the first subscription of the UE; establishing a third connection of a third RAT associated with a second subscription of the UE; tuning away from the first connection to receive a communication via the third connection; tuning back to the first connection from the third connection; and configuring a transmission power parameter of the first connection based at least in part on a time-averaged parameter.

Aspect 2: The method of Aspect 1, wherein the configuration of the transmission power parameter comprises: applying a maximum transmission power limit (MTPL) to the first connection, wherein the MTPL is based at least in part on an energy budget for the UE.

Aspect 3: The method of Aspect 2, wherein applying the MTPL to the first connection comprises: applying the MTPL to the first connection for a configured number of subframes after tuning back to the first connection.

Aspect 4: The method of Aspect 2, wherein applying the MTPL to the first connection comprises: applying the MTPL to the first connection for a configured amount of time after tuning back to the first connection.

Aspect 5: The method of any of Aspects 1-4, wherein configuration of the transmission power parameter comprises: reverting to a configuration of the transmission power parameter used for the first connection before tuning away from the first connection.

Aspect 6: The method of any of Aspects 1-5, further comprising: measuring one or more of a first pathloss reference signal (PL RS) or a first reference signal received power (RSRP) before tuning away from the first connection; measuring one or more of a second PL RS measurement or a second RSRP after tuning back to the first connection; and applying, based at least in part on one or more of a difference between the first PL RS and the second PL RS or a difference between the first RSRP and the second RSRP, a modification to a maximum transmission power limit (MTPL) used for the first connection before tuning away from the first connection.

Aspect 7: The method of Aspect 6, wherein application, based at least in part on one or more of the difference between the first PL RS and the second PL RS or the difference between the first RSRP and the second RSRP, of the modification to the value of the MTPL used for the first connection before tuning away from the first connection comprises: application of the modification to value of the MTPL based at least in part on the difference between the first PL RS and the second PL RS satisfying a PL RS change threshold or the difference between the first RSRP and the second RSRP satisfying an RSRP change threshold.

Aspect 8: The method of any of Aspects 1-7, further comprising: determining one or more of a first pathloss reference signal (PL RS) measurement or a first reference signal received power (RSRP) before tuning away from the first connection; determining one or more of a second PL RS measurement or a second RSRP after tuning back to the first connection; and determining, based at least in part on one or more of a difference between the first PL RS and the second PL RS or a difference between the first RSRP and the second RSRP, to modify a value of the transmission power parameter used for the first connection before tuning away from the first connection.

Aspect 9: The method any of Aspects 1-8, wherein configuration of the transmission power parameter of the first connection comprises: configuring the transmission power parameter for transmitting via a data channel of the first connection based at least in part on applying a first maximum transmission power limit (MTPL) for the first connection after tuning back to the first connection; and configuring the transmission power parameter for transmitting via a control channel of the first connection based at least in part on applying a second MTPL for the first connection after tuning back to the first connection.

Aspect 10: The method of Aspect 9, wherein the first MTPL is less than the second MTPL.

Aspect 11: The method of any of Aspects 1-10, wherein establishment of the first connection and establishment of the second connection comprises establishment of a dual connectivity mode connection associated with the first subscription of the UE.

Aspect 12: The method of any of Aspects 1-11, wherein the time averaged parameter comprises one or more of: a specific absorption rate parameter, or a maximum permissible exposure parameter.

Aspect 13: An apparatus for wireless communication at a device, comprising a processor; memory coupled with the processor; and instructions stored in the memory and executable by the processor to cause the apparatus to perform the method of one or more of Aspects 1-12.

Aspect 14: A device for wireless communication, comprising a memory and one or more processors coupled to the memory, the one or more processors configured to perform the method of one or more of Aspects 1-12.

Aspect 15: An apparatus for wireless communication, comprising at least one means for performing the method of one or more of Aspects 1-12.

Aspect 16: A non-transitory computer-readable medium storing code for wireless communication, the code comprising instructions executable by a processor to perform the method of one or more of Aspects 1-12.

Aspect 17: A non-transitory computer-readable medium storing a set of instructions for wireless communication, the set of instructions comprising one or more instructions that, when executed by one or more processors of a device, cause the device to perform the method of one or more of Aspects 1-12.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
    establishing a first connection of a first radio access technology (RAT) associated with a first subscription of the UE;
    establishing a second connection of a second RAT associated with the first subscription of the UE;
    establishing a third connection of a third RAT associated with a second subscription of the UE;
    measuring, for the first connection, one or more of a first pathloss reference signal (PL RS) measurement or a first reference signal received power (RSRP);
    tuning away from the first connection to receive a communication via the third connection;
    tuning back to the first connection from the third connection;
    measuring, for the first connection, one or more of a second PL RS measurement or a second RSRP; and
    configuring, based at least in part on one or more of a difference between the first PL RS and the second PL RS or a difference between the first RSRP and the second RSRP, a transmission power parameter of the first connection based at least in part on a time-averaged parameter, wherein the time-averaged parameter includes a specific absorption rate parameter or a maximum permissible exposure parameter, and based at least in part on the tuning back to the first connection.

2. The method of claim 1, wherein the configuration of the transmission power parameter comprises:
    applying a maximum transmission power limit (MTPL) to the first connection, wherein the MTPL is based at least in part on an energy budget for the UE.

3. The method of claim 2, wherein applying the MTPL to the first connection comprises:
    applying the MTPL to the first connection for a configured number of subframes after tuning back to the first connection.

4. The method of claim 2, wherein applying the MTPL to the first connection comprises:

applying the MTPL to the first connection for a configured amount of time after tuning back to the first connection.

5. The method of claim 1, wherein configuration of the transmission power parameter comprises:
reverting to a configuration of the transmission power parameter used for the first connection before tuning away from the first connection.

6. The method of claim 1, further comprising:
applying, based at least in part on one or more of the difference between the first PL RS and the second PL RS or the difference between the first RSRP and the second RSRP, a modification to a maximum transmission power limit (MTPL) used for the first connection before tuning away from the first connection.

7. The method of claim 6, wherein application, based at least in part on one or more of the difference between the first PL RS and the second PL RS or the difference between the first RSRP and the second RSRP, of the modification to a value of the MTPL used for the first connection before tuning away from the first connection comprises:
application of the modification to value of the MTPL based at least in part on the difference between the first PL RS and the second PL RS satisfying a PL RS change threshold or the difference between the first RSRP and the second RSRP satisfying an RSRP change threshold.

8. The method of claim 1, further comprising:
determining one or more of a first pathloss reference signal (PL RS) measurement or a first reference signal received power (RSRP) before tuning away from the first connection;
determining one or more of a second PL RS measurement or a second RSRP after tuning back to the first connection; and
determining, based at least in part on one or more of a difference between the first PL RS and the second PL RS or a difference between the first RSRP and the second RSRP, to modify a value of the transmission power parameter used for the first connection before tuning away from the first connection.

9. The method of claim 1, wherein configuration of the transmission power parameter of the first connection comprises:
configuring the transmission power parameter for transmitting via a data channel of the first connection based at least in part on applying a first maximum transmission power limit (MTPL) for the first connection after tuning back to the first connection; and
configuring the transmission power parameter for transmitting via a control channel of the first connection based at least in part on applying a second MTPL for the first connection after tuning back to the first connection.

10. The method of claim 9, wherein the first MTPL is less than the second MTPL.

11. The method of claim 1, wherein establishment of the first connection and establishment of the second connection comprises establishment of a dual connectivity mode connection associated with the first subscription of the UE.

12. The method of claim 1, wherein the specific absorption rate parameter or the maximum permissible exposure parameter are based at least in part on a frequency range associated with the UE.

13. A user equipment (UE) for wireless communication, comprising:
one or more memories; and
one or more processors, coupled to the one or more memories, configured to:
establish a first connection of a first radio access technology (RAT) associated with a first subscription of the UE;
establish a second connection of a second RAT associated with the first subscription of the UE;
establish a third connection of a third RAT associated with a second subscription of the UE;
measure, for the first connection, one or more of a first pathloss reference signal (PL RS) measurement or a first reference signal received power (RSRP);
tune away from the first connection to receive a communication via the third connection;
tune back to the first connection from the third connection;
measure, for the first connection, one or more of a second PL RS measurement or a second RSRP; and
configure, based at least in part on one or more of a difference between the first PL RS and the second PL RS or a difference between the first RSRP and the second RSRP, a transmission power parameter of the first connection based at least in part on a time-averaged parameter, wherein the time-averaged parameter includes a specific absorption rate parameter or a maximum permissible exposure parameter, and based at least in part on the tuning back to the first connection.

14. The UE of claim 13, wherein the configuration of the transmission power parameter comprises:
apply a maximum transmission power limit (MTPL) to the first connection, wherein the MTPL is based at least in part on an energy budget for the UE.

15. The UE of claim 14, wherein the one or more processors, to apply the MTPL to the first connection, are configured to:
apply the MTPL to the first connection for a configured number of subframes after tuning back to the first connection.

16. The UE of claim 14, wherein the one or more processors, to apply the MTPL to the first connection, are configured to:
apply the MTPL to the first connection for a configured amount of time after tuning back to the first connection.

17. The UE of claim 13, wherein configuration of the transmission power parameter comprises:
revert to a configuration of the transmission power parameter used for the first connection before tuning away from the first connection.

18. The UE of claim 13, wherein the one or more processors are further configured to:
apply, based at least in part on one or more of the difference between the first PL RS and the second PL RS or the difference between the first RSRP and the second RSRP, a modification to a maximum transmission power limit (MTPL) used for the first connection before tuning away from the first connection.

19. The UE of claim 18, wherein application, based at least in part on one or more of the difference between the first PL RS and the second PL RS or the difference between the first RSRP and the second RSRP, of the modification to a value of the MTPL used for the first connection before tuning away from the first connection comprises:
application of the modification to value of the MTPL based at least in part on the difference between the first PL RS and the second PL RS satisfying a PL RS change threshold or the difference between the first RSRP and the second RSRP satisfying an RSRP change threshold.

20. The UE of claim 13, wherein the one or more processors are further configured to:
- determine one or more of a first pathloss reference signal (PL RS) measurement or a first reference signal received power (RSRP) before tuning away from the first connection;
- determine one or more of a second PL RS measurement or a second RSRP after tuning back to the first connection; and
- determine, based at least in part on one or more of a difference between the first PL RS and the second PL RS or a difference between the first RSRP and the second RSRP, to modify a value of the transmission power parameter used for the first connection before tuning away from the first connection.

21. The UE of claim 13, wherein configuration of the transmission power parameter of the first connection comprises:
- configure the transmission power parameter for transmitting via a data channel of the first connection based at least in part on applying a first maximum transmission power limit (MTPL) for the first connection after tuning back to the first connection; and
- configure the transmission power parameter for transmitting via a control channel of the first connection based at least in part on applying a second MTPL for the first connection after tuning back to the first connection.

22. The UE of claim 21, wherein the first MTPL is less than the second MTPL.

23. The UE of claim 13, wherein establishment of the first connection and establishment of the second connection comprises establishment of a dual connectivity mode connection associated with the first subscription of the UE.

24. The UE of claim 13, wherein the specific absorption rate parameter or the maximum permissible exposure parameter are based at least in part on a frequency range associated with the UE.

25. A non-transitory computer-readable medium storing a set of instructions for wireless communication, the set of instructions comprising:
- one or more instructions that, when executed by one or more processors of a user equipment (UE), cause the UE to:
  - establish a first connection of a first radio access technology (RAT) associated with a first subscription of the UE;
  - establish a second connection of a second RAT associated with the first subscription of the UE;
  - establish a third connection of a third RAT associated with a second subscription of the UE;
  - measure, for the first connection, one or more of a first pathloss reference signal (PL RS) measurement or a first reference signal received power (RSRP);
  - tune away from the first connection to receive a communication via the third connection;
  - tune back to the first connection from the third connection;
  - measure, for the first connection, one or more of a second PL RS measurement or a second RSRP; and
  - configure, based at least in part on one or more of a difference between the first PL RS and the second PL RS or a difference between the first RSRP and the second RSRP, a transmission power parameter of the first connection based at least in part on a time-averaged parameter, wherein the time-averaged parameter includes a specific absorption rate parameter or a maximum permissible exposure parameter, and based at least in part on the tuning back to the first connection.

26. The non-transitory computer-readable medium of claim 25, wherein the one or more instructions further cause the UE to:
- apply a maximum transmission power limit (MTPL) to the first connection, wherein the MTPL is based at least in part on an energy budget for the UE.

27. The non-transitory computer-readable medium of claim 25, wherein the one or more instructions further cause the UE to:
- apply, based at least in part on one or more of the difference between the first PL RS and the second PL RS or the difference between the first RSRP and the second RSRP, a modification to a maximum transmission power limit (MTPL) used for the first connection before tuning away from the first connection.

28. An apparatus for wireless communication, comprising:
- means for establishing a first connection of a first radio access technology (RAT) associated with a first subscription of the apparatus;
- means for establishing a second connection of a second RAT associated with the first subscription of the apparatus;
- means for establishing a third connection of a third RAT associated with a second subscription of the apparatus;
- means for measuring, for the first connection, one or more of a first pathloss reference signal (PL RS) measurement or a first reference signal received power (RSRP);
- means for tuning away from the first connection to receive a communication via the third connection;
- means for tuning back to the first connection from the third connection;
- means for measuring, for the first connection, one or more of a second PL RS measurement or a second RSRP; and
- means for configuring, based at least in part on one or more of a difference between the first PL RS and the second PL RS or a difference between the first RSRP and the second RSRP, a transmission power parameter of the first connection based at least in part on a time-averaged parameter, wherein the time-averaged parameter includes a specific absorption rate parameter or a maximum permissible exposure parameter, and based at least in part on the tuning back to the first connection.

29. The apparatus of claim 28, further comprising:
- means for applying a maximum transmission power limit (MTPL) to the first connection, wherein the MTPL is based at least in part on an energy budget for the apparatus.

30. The apparatus of claim 28, further comprising:
- means for applying, based at least in part on one or more of the difference between the first PL RS and the second PL RS or the difference between the first RSRP and the second RSRP, a modification to a maximum transmission power limit (MTPL) used for the first connection before tuning away from the first connection.

* * * * *